US009691044B2

United States Patent
Hoen, IV et al.

(10) Patent No.: US 9,691,044 B2
(45) Date of Patent: Jun. 27, 2017

(54) APPLICATION SHELL LOGIN ROLE BASED ACCESS CONTROL

(71) Applicant: Bank of America Corporation, Charlotte, NC (US)

(72) Inventors: Hudson Philip Hoen, IV, Wilmington, DE (US); Jason N. Alexandrian, Braselton, GA (US)

(73) Assignee: Bank of America Corporation, Charlotte, NC (US)

(*) Notice: Subject to any disclaimer, the term of this patent is extended or adjusted under 35 U.S.C. 154(b) by 254 days.

(21) Appl. No.: 14/072,111

(22) Filed: Nov. 5, 2013

(65) Prior Publication Data
US 2015/0127406 A1   May 7, 2015

(51) Int. Cl.
G06Q 10/06 (2012.01)
H04L 29/06 (2006.01)

(52) U.S. Cl.
CPC ..... G06Q 10/06312 (2013.01); H04L 63/102 (2013.01); H04L 63/104 (2013.01)

(58) Field of Classification Search
CPC ......... G06Q 10/00; G06Q 40/00; G06F 17/60
USPC ....................................................... 705/7.22
See application file for complete search history.

(56) References Cited

U.S. PATENT DOCUMENTS

| | | | |
|---|---|---|---|
| 5,519,773 A * | 5/1996 | Dumas et al. | 379/265.05 |
| 5,787,163 A * | 7/1998 | Taylor et al. | 379/266.08 |
| 6,014,666 A * | 1/2000 | Helland et al. | |
| 6,023,765 A * | 2/2000 | Kuhn | 726/4 |
| 6,141,698 A | 10/2000 | Krishnan et al. | |
| 6,163,607 A * | 12/2000 | Bogart et al. | 379/266.01 |
| 6,636,599 B1 * | 10/2003 | Mullen | 379/265.05 |
| 6,639,982 B1 * | 10/2003 | Stuart et al. | 379/266.03 |
| 6,772,156 B1 * | 8/2004 | Rogers et al. | |
| 7,023,979 B1 * | 4/2006 | Wu et al. | 379/265.11 |
| 7,110,525 B1 * | 9/2006 | Heller et al. | 379/265.11 |
| 7,117,448 B2 * | 10/2006 | Cooper et al. | 715/764 |
| 7,454,706 B1 | 11/2008 | Matthews et al. | |
| 7,552,199 B2 * | 6/2009 | Pomerantz | 709/219 |
| 7,562,358 B2 | 7/2009 | Bennett et al. | |
| 7,577,751 B2 * | 8/2009 | Vinson et al. | 709/231 |
| 7,650,505 B1 * | 1/2010 | Masurkar | 713/176 |
| 7,650,627 B1 * | 1/2010 | Stancheva et al. | 726/1 |
| 7,653,931 B1 | 1/2010 | Peterson et al. | |
| 7,793,284 B2 * | 9/2010 | Mason et al. | 717/174 |
| 7,987,516 B2 * | 7/2011 | Chandrasekhar et al. | 726/28 |
| 8,214,398 B1 | 7/2012 | Cowan et al. | |
| 8,312,113 B2 | 11/2012 | Kennedy | |
| 8,321,461 B2 | 11/2012 | Hinojosa et al. | |

(Continued)

Primary Examiner — Romain Jeanty
(74) Attorney, Agent, or Firm — Michael A. Springs; Moore & Van Allen PLLC; Nicholas C. Russell

(57) ABSTRACT

Embodiments for providing roles based system access to a user include systems for identifying an application login event and a role associated with the login event. Further the embodiments include selecting code associated with the identified role, inserting, by a processor, the code into an application shell; and providing, by a processor, the content of the shell to an application associated with a computing device of the user in response to the login event, the content of the shell comprising only role specific data. In specific embodiments, data unrelated to the identified role is not provided to the application or stored in the computing device.

14 Claims, 13 Drawing Sheets

(56) References Cited

U.S. PATENT DOCUMENTS

| | | |
|---|---|---|
| 8,375,439 B2 | 2/2013 | Mann et al. |
| 8,745,087 B2 * | 6/2014 | Daily et al. .................. 707/781 |
| 8,756,677 B2 | 6/2014 | Gargi |
| 2004/0139032 A1 * | 7/2004 | Rowan ........................... 705/80 |
| 2006/0050870 A1 * | 3/2006 | Kimmel et al. ................ 380/30 |
| 2006/0218394 A1 * | 9/2006 | Yang ............................ 713/167 |
| 2007/0056026 A1 * | 3/2007 | Britton et al. ..................... 726/5 |
| 2007/0169204 A1 * | 7/2007 | Janakiraman et al. ......... 726/28 |
| 2007/0214497 A1 * | 9/2007 | Montgomery et al. ........... 726/4 |
| 2008/0098444 A1 | 4/2008 | Shikata et al. |
| 2008/0120129 A1 | 5/2008 | Seubert et al. |
| 2008/0212760 A1 * | 9/2008 | Beshears et al. ........ 379/210.01 |
| 2008/0289036 A1 * | 11/2008 | Kandasamy et al. ............ 726/21 |
| 2009/0076880 A1 * | 3/2009 | Kramer .............................. 705/9 |
| 2009/0276840 A1 * | 11/2009 | Cao et al. .......................... 726/9 |
| 2009/0281785 A1 * | 11/2009 | Ressler et al. ..................... 704/2 |
| 2009/0300736 A1 * | 12/2009 | Chen et al. ....................... 726/5 |
| 2010/0082133 A1 | 4/2010 | Chouinard et al. |
| 2011/0004649 A1 * | 1/2011 | Nord et al. .................. 709/202 |
| 2011/0023082 A1 * | 1/2011 | Narasinghanallur et al. .... 726/1 |
| 2012/0323717 A1 | 12/2012 | Kirsch |
| 2013/0159378 A1 | 6/2013 | Misovski et al. |
| 2013/0159984 A1 | 6/2013 | Misovski et al. |
| 2013/0159993 A1 | 6/2013 | Misovski et al. |
| 2013/0344469 A1 | 12/2013 | Abrahamson et al. |
| 2015/0229699 A1 | 8/2015 | Liu |

* cited by examiner

APPLICATION SHELL LOGIN ROLE BASED ACCESS CONTROL

BACKGROUND

Many systems or applications contain a large amount of programming for databases, tools, and other features for performing a wide variety of tasks. Such systems usually store all of the programming and all versions of the applications or systems locally on the user's computer even if the user does not use some of the systems' features. This process, however, consumes large amounts of bandwidth, takes up storage space of the users' computers, and is prone to security breaches.

BRIEF SUMMARY

The embodiments provided herein are directed to systems for providing roles based access to a user. In some embodiments, the systems include a computer apparatus including a processor and a memory and a deployment software module stored in the memory, comprising executable instructions that when executed by the processor cause the processor to identify an application login event. In some embodiments, the executable instructions further cause the processor to identify a role associated with the login event, wherein the role comprises one or more job functions. In some embodiments, the executable instructions further cause the processor to select code associated with the identified role. In some embodiments, the executable instructions further cause the processor to insert the code into an application shell. In some embodiments, the executable instructions further cause the processor to provide the content of the shell to an application associated with a computing device of the user in response to the login event, the content of the shell comprising only role specific data. In some embodiments, data unrelated to the identified role is not provided to the application or stored in the computing device.

In other embodiments of the systems, the executable instructions further cause the processor to receive login data comprising user credentials or device identifiers and match the login data and the role. In further embodiments, the executable instructions further cause the processor to calculate the number of times the user has logged into the application during a previous period of time and determine the experience level associated with the role based on the calculated number. In still further embodiments, the executable instructions further cause the processor to receive login data comprising user inputs, determine the sequence of user inputs, the number of required user inputs, and the types of user inputs and determine that the identified role is associated with a certain job title or work group based on the user input determination.

In additional embodiments of the systems, the executable instructions further cause the processor to calculate at least one of the number of queues, the length of each queue, the average customer wait time, and the amount of required user input for a work task, in response to the calculation, determine that the total number of available users is not sufficient to provide adequate work coverage, and create a new role for the user based on the work coverage determination. In further embodiments, the executable instructions further cause the processor to insert new code into the application shell, remove at least a portion of the selected code from the application shell, or rewrite the selected code. In other embodiments of the systems, the executable instructions further cause the processor to calculate a role score as the product of the total number of training modules completed by the user multiplied by a predetermined factor, assign a new role based on the calculated role score, and modify the content of the application shell to include additional code associated with the new role.

In still other embodiments, the executable instructions further cause the processor to switch the new role back to the identified role after a predetermined period of time. In some embodiments, the content of the shell is streamed to the application and not stored on the computing device. In further embodiments, the executable instructions further cause the processor to compress the selected code and store the compressed code in a database. In additional embodiments, the selected code comprises instruction for modifying account data, calculating interest rates, adjusting account balances, performing searches, creating calling queues for account holders, providing rule specific notifications, or linking to external websites.

Further provided herein are embodiments directed to a computer program product for providing roles based access to a user. In some embodiments, the computer program product comprises a computer readable storage medium having computer readable program code embodied therewith, the computer readable program code comprising computer readable program code configured to identify an application login event. In some embodiments, the computer program product further includes computer readable program code configured to identify a role associated with the login event, wherein the role comprises one or more job functions. In some embodiments, the computer program product further includes computer readable program code configured to computer readable program code configured to select code associated with the identified role. In some embodiments, the computer program product further includes computer readable program code configured to computer readable program code configured to insert the code into an application shell. In some embodiments, the computer program product further includes computer readable program code configured to computer readable program code configured to provide the content of the shell to an application associated with a computing device of the user in response to the login event, the content of the shell comprising only role specific data. In some embodiments, data unrelated to the identified role is not provided to the application or stored in the computing device.

In further embodiments, the computer program product further includes computer readable program code configured to receive login data comprising user credentials or device identifiers; and match the login data and the role.

In further embodiments, the computer program product further includes computer readable program code configured to calculate at least one of the number of queues, the length of each queue, the average customer wait time, and the amount of required user input for a work task, in response to the calculation, determine that the total number of available users is not sufficient to provide adequate work coverage, and create a new role for the user based on the work coverage determination.

In further embodiments, the computer program product further includes computer readable program code configured to insert new code into the application shell; remove at least a portion of the selected code from the application shell; or rewrite the selected code. In further embodiments, the computer program product further includes computer readable program code configured to calculate a role score as the product of the total number of training modules completed by the user multiplied by a predetermined factor, assign a new role based on the calculated role score, and modify the content of the application shell to include additional code associated with the new role.

In additional embodiments, a computer-implemented method providing roles based access to a user is provided. In some embodiments, the method includes identifying, by a processor, an application login event. In some embodiments, the method includes identifying, by a processor, a role associated with the login event, wherein the role comprises one or more job functions. In some embodiments, the method includes selecting code associated with the identified role. In some embodiments, the method includes inserting, by a processor, the code into an application shell. In some embodiments, the method includes providing, by a processor, the content of the shell to an application associated with a computing device of the user in response to the login event, the content of the shell comprising only role specific data. In some embodiments, data unrelated to the identified role is not provided to the application or stored in the computing device.

In additional embodiments of the method, the method includes receiving login data comprising user inputs, determining, by a processor, the sequence of user inputs, the number of required user inputs, and the types of user inputs, and determining, by a processor, that the identified role is associated with a certain job title or work group based on the user input determination. In some embodiments, the method includes calculating, by a processor, at least one of the number of queues, the length of each queue, the average customer wait time, and the amount of required user input for a work task, in response to the calculation, determining, by a processor, that the total number of available users is not sufficient to provide adequate work coverage, and creating, by a processor, a new role for the user based on the work coverage determination. In some embodiments, the method includes inserting, by a processor, new code into the application shell, removing, be a processor, at least a portion of the selected code from the application shell, or rewriting, by a processor, the selected code.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 8 is an illustration of a graphical user interface for manipulating roles based access for a user in accordance with various embodiments;

FIG. 9 is an illustration of a graphical user interface for manipulating roles based access for a user in accordance with various embodiments;

FIG. 13 is an illustration of a graphical user interface for manipulating roles based access for a user in accordance with various embodiments.

DETAILED DESCRIPTION

Figure 1:
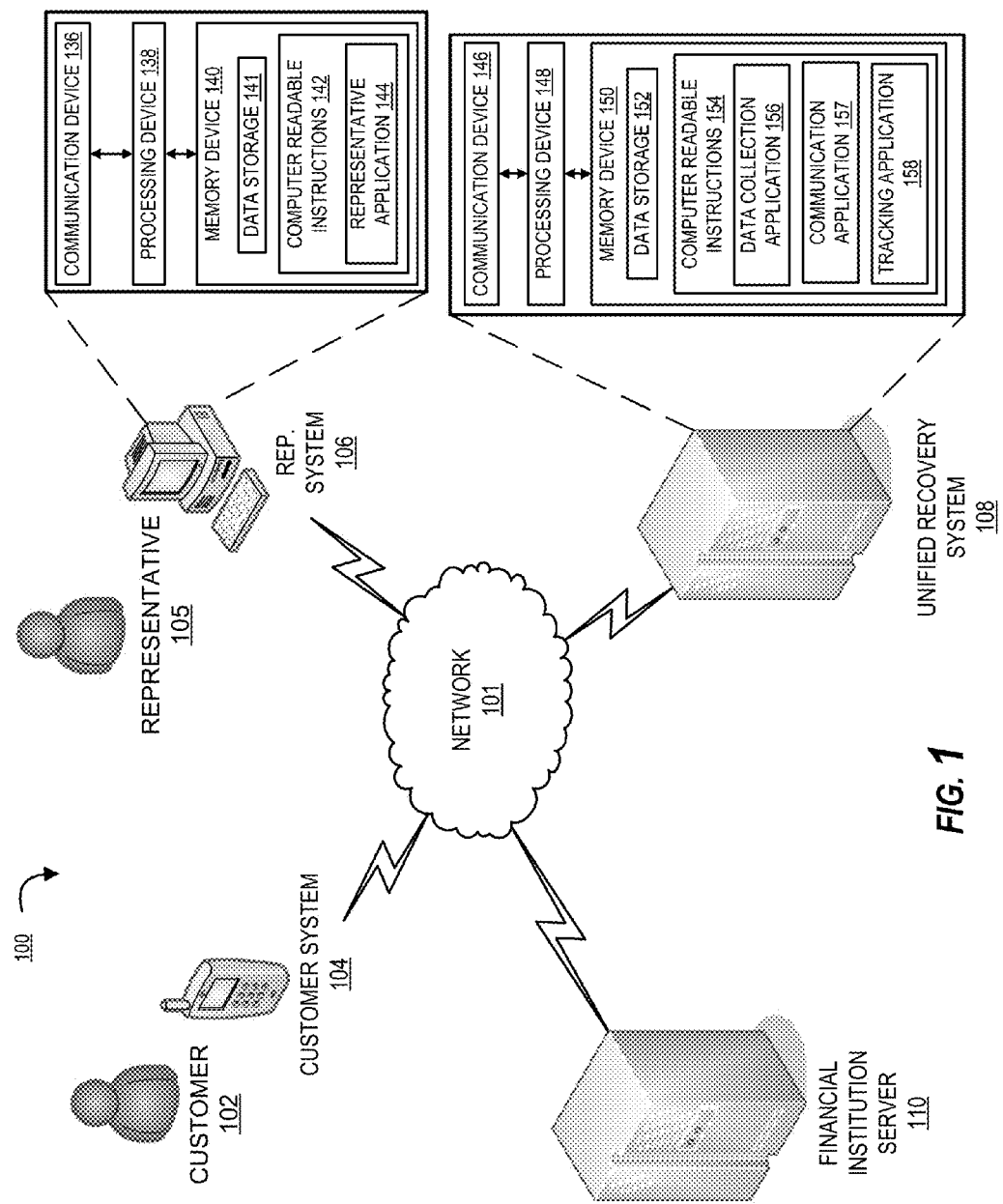
FIG. 1 provides a block diagram illustrating a system and environment for providing roles based access.

The embodiments presented herein are directed to systems, methods, and computer program products for providing application (e.g., a client) access based on user roles. In some embodiments, only modules and code associated with a particular role is saved to a user's device and/or streamed to the client. In particular embodiments, a login event is identified and associated with a role. Code, modules, and other application data specific to the identified role are then selected and provided to the client. In this way, an application specific to a user's role can be built up every time a user logs in without the need to provide and store all components to the entire system or all versions of the application to a user's computing device. This deployment service loads the role specific code (not all code) in memory locally or offsite, which diminishes the footprint size of the application programming, avoids massive amounts of downloads, reduces load times, and reduces security risk because the entire code is not provided to the application and/or user. Further, modifications and updates to the application and creation of new roles can be performed as needed without technical intervention.

The embodiments of the disclosure may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that provide roles based access to clients or other applications are provided. As used herein, the term "roles" or "role" refers to, but is not limited to one or more job functions, job titles, work experience, training, expertise, group memberships, and/or work categories. Exemplary roles include job functions related to a type of account, employment category, job title, group, team, line of business, customer type, and the like. A user can have permission to act in one or more roles. In some cases, the user may login to a system under one particular role at a given time even if the user has permission to act in more than one role. In other cases, a user may only have a single role. Depending on the roles, different users may have access to different data, modules, code, tools, databases, and aspects of a system. For example, an administrator or team leader may have access to a greater amount of data and tools than a lower level employee. In other examples, a user associated with a credit card account job function may only have access to data associated with credit card accounts and not to data associated with retirement accounts. In still other example, the role of the user using the roles based application can be switched to another role, updated, modified, or a new role can be created.

FIG. 1 provides a unified recovery system environment 100, in accordance with embodiments of the present invention. As illustrated in FIG. 1, a unified recover system 108 is operatively coupled, via a network 101 to a customer system 104, to a representative system 106, and to a financial institution server 110. In this way, the unified recovery system 108 can send information to and receive information from the customer system 104, the representative system 106, and financial institution server 110, to correlate all of the customer's relationships with an entity into one unified recovery system. FIG. 1 illustrates only one example of an embodiment of a unified recovery system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the customer 102 is an individual who has products with the entity. These products may be one or more contracts, accounts, loans, transactions, agreements, or the like. As such, the customer 102 may have one or more products with payments in arrears. In some embodiments, the customer 102 may be a merchant or a person, employee, agent, independent contractor, and the like acting on behalf of the merchant that may have one or more products with payments in arrears with the entity.

As illustrated in FIG. 1, a unified recovery system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to a representative system 106, a customer system 104, and a financial institution server 110. As such, the communication device 146 generally comprises a modem, server, or other device for communicating with other devices on a network 101.

As further illustrated in FIG. 1, the unified recovery system 108 comprises computer-readable instructions 154 stored in the memory device 150, which in one embodiment includes the computer-readable instructions 154 of a data collection application 156. In some embodiments, the computer-readable instructions 154 include a communication application 157. In some embodiments, the computer-readable instructions 154 include a tracking application 158. In still further embodiments, the computer-readable instructions 154 include a deployment application (not shown). In some embodiments, the memory device 150 includes data storage 152 for storing data related to unified recovery system including but not limited to data created and/or used by the data collection application 156, communication application 157, and/or tracking application 158.

In the embodiment illustrated in FIG. 1, the data collection application 156 may collect and compile recover programs utilized across the entity, customer relationship data across an entity, and to generate a centralized location for customer data. In some embodiments, the data collection application 156 may collect and compile recovery products utilized across the entity into a single centralized unified recovery system 108. These may be collected from entity representative systems 106, the financial institution server 110, and/or other systems. These recover products may be internal or external dockets, ledgers, software, systems, or the like that are designed to initiate, monitor, and record any communication or payment associated with customer 102 products in arrears. In further embodiments, the data collection application 156 may collect and compile customer relationship data. In this way, the data collection application 156 may compile all information that an entity may have associated with a customer 102. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity. In other embodiments, the data collection application 156 may merge the recovery programs and the customer relationship data together into the unified recovery system 108. This data may be stored grouped by on the customer 102, customer identification number, account number, or telephone number. In this way, the system may generate a single centralized location for customer relationships for a representative to view and interact with. As such, any different recovery products and customer relationship data may be integrated into the one centralized unified recovery system.

In the embodiment illustrated in FIG. 1 the unified recovery system 108 further comprises a communication application 157. The communication application 157 allows for presentment of data to the representative, for rules determination and presentment, determines lead accounts, and for communication via a network 101 with the customer 102. In some embodiments, the communication application 157 allows for presentment of data to the representative. This data may be customer 102 information, prior communications, communication dispositions, current accounts, accounts in arrears, lead accounts, and the like. In this way, the representative may have information associated with all customer relationships within the entity easily accessible for his/her communication with the customer 102. In some embodiments, the communication application 157 allows for incorporation of a rules engine into the information provided to the representative. In some embodiments, the rules associated with the rules engine may be manually inputted by a representative. In some embodiments, the rules associated with the rules engine may be automatically inputted. In some embodiments, the rules may be based on entity requirements or preferences. In some embodiments, the rules may be based on customer preferences. In yet other embodiments, the rules may be based on legal requirements or restrictions. These rules may be communicated to the representative system 106 for the representative 105 from the communication application 157 via the network 101. In this way, the representative 105 may be aware of the rules for customer 102 communications.

Along with the rules, the communication application 157 may also determine a lead account associated with the customer 102, identify an appropriate representative 105, warn or prohibit communications to a customer 102, or require disposition input after a communication. Determining a lead account requires the communication application 157 to communicate with the financial institution server 110 to select an account in arrears that is most important for the entity to recover. Selecting an appropriate representative may be achieved by the communication application 157 based on which representative has experience with that particular customer, knowledge with that particular lead account, or general expertise regarding a field associated with the lead account. The communication application 157 may communicate warning or prohibiting communications to a customer 102 via the network 101 to a representative system 106.

In some embodiments, the communication application 157 may allow for representative 105 communications with the customer 102 via the network 101. In this way, the communication application 157 allows for the communication, limits the communication, and/or doesn't allow any communication based on the rules determined. In the embodiment illustrated in FIG. 1, the unified recovery system 108 further comprises a tracking application 158. The tracking application 158 tracks the communications of customer 102. As such, dates, times, outcomes, responses, dispositions, or the like associated with each and every attempt to contact the customer 102. In this way, the system may track whether a communication went through to the customer, whom the representative spoke to, the duration of the communication, time of communication, date of communication, or the like.

As illustrated in FIG. 1, a representative 105 may be an individual customer service representative for an entity, an operator, and the like. In some embodiments the representative 105 may be an individual employed by the entity. In some embodiments, the representative 105 may be an outside contractor for the entity. The representative 105 may have unique skills or experience with recovery payments in arrears for various products associated with products provided by the entity.

As illustrated in FIG. 1, the representative system 106 generally comprises a communication device 136, a processing device 138, and a memory device 140. The processing device 138 is operatively coupled to the communication device 136 and the memory device 140. In some embodiments, the processing device 138 may send or receive data from the customer system 104, financial institution server 110, and/or the unified recover system 108 via the communication device 136 over a network 101. As such, the communication device 136 generally comprises a modem, server, or other device for communicating with other devices on the network 101.

As further illustrated in FIG. 1, the representative system 106 comprises computer-readable instructions 142 stored in the memory device 140, which in one embodiment includes the computer-readable instructions 142 of a representative application 144. In the embodiment illustrated in FIG. 1, the representative application 144 allows the representative system 106 to be linked to the unified recovery system 108 to communicate, via a network 101, the information related to the communications with a customer 102 related to products with payments in arrears. In some embodiments, the communication from the representative 105, such as communication inputted on the unified application by the representative 105, may be communicated to the unified recover system 108 via the communication device 136. The representative application 144 may also allow the representative to receive data, such as the unified application including customer relationships, or the like, in order to communicate with the customer. The memory device 140 further includes a data storage device 141.

FIG. 1 also illustrates a customer system 104. The customer system 104 generally comprises systems with devices the same or similar to the devices described for the unified recovery system 108, and/or the representative system 106 (i.e., communication device, processing device, and memory device). Therefore, the customer system 104 may communicate with the unified recovery system 108, the representative system 106, and/or the financial institution server 110 in the same or similar way as previously described with respect to each system. The customer system 104, in some embodiments, is comprised of systems and devices that allow the customer 102 to communicate with the representative 105 over a network 101. The customer system 104 may be, for example, a home phone, a desktop personal computer, a mobile system, such as a cellular phone, smart phone, personal data assistant (PDA), laptop, or the like. Although only a single customer system 104 is depicted in FIG. 1, the unified recovery system environment 100 may contain numerous customer systems 104.

The financial institution server 110 is operatively coupled to the unified recovery system 108, the representative system 106, and/or the customer system 104 through the network 101. The financial institution server 110 has systems with devices the same or similar to the devices described for the unified recovery system 108 and the representative system 106 (i.e., communication device, processing device, and memory device). Therefore, the financial institution server 110 communicate with the unified recovery system 108, the representative system 106, and/or the customer system 104 in the same or similar way as previously described with respect to each system. The financial institution server 110, in some embodiments, is comprised of systems and devices that allow the unified recover system 108, the representative system 106, and the customer system 104 access to one or more accounts associated with the customer 102 with the financial institution.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2:
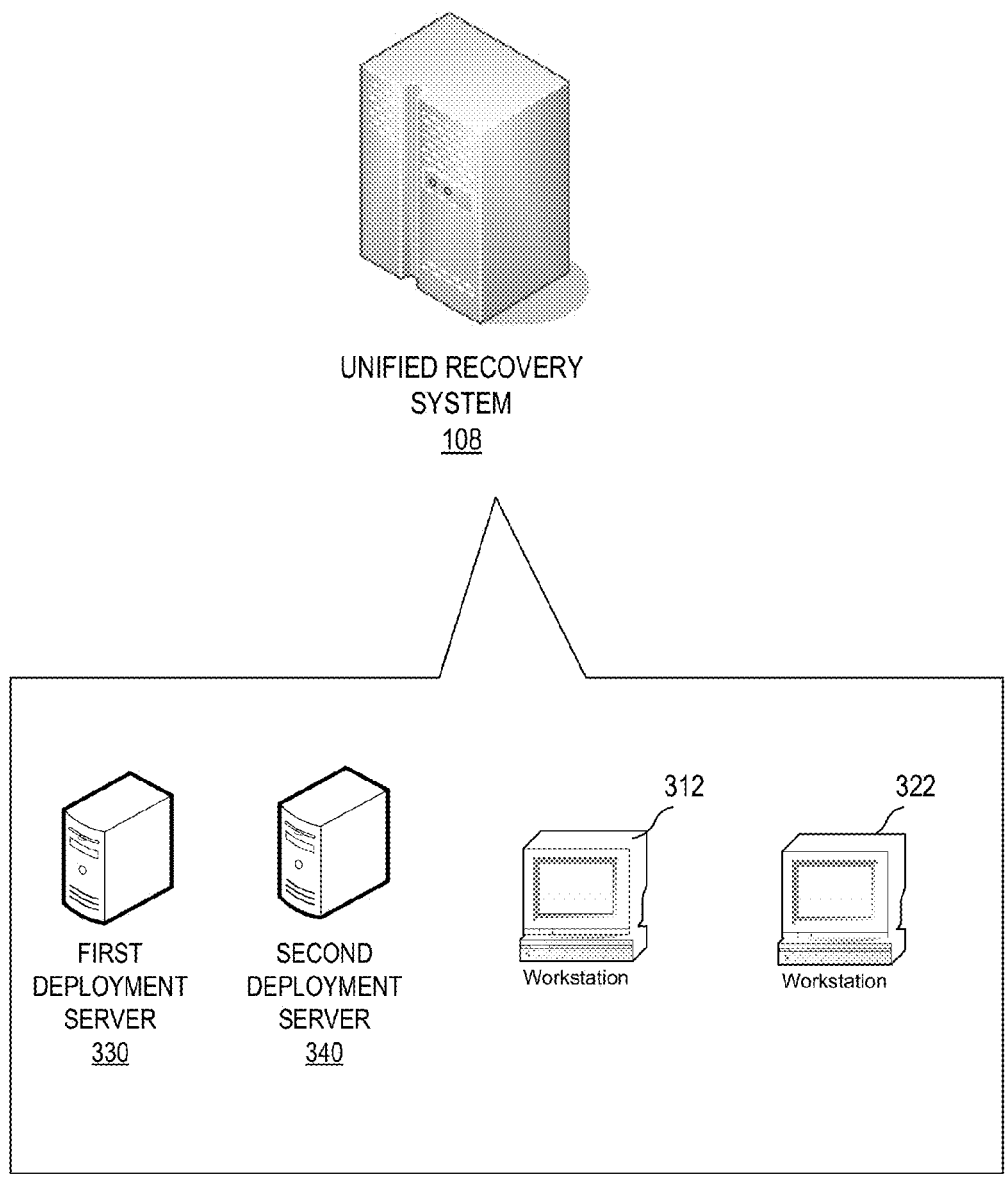
FIG. 2 provides a block diagram illustrating the unified recovery system of FIG. 1, in accordance with various embodiments.

The unified recovery system 108 is further illustrated in FIG. 2. As shown in the illustrated embodiment, the unified recovery system 108 includes a first deployment server 330, a second deployment server 340, a computing device or work station 312, and a computing device or workstation 322.

Figure 3:
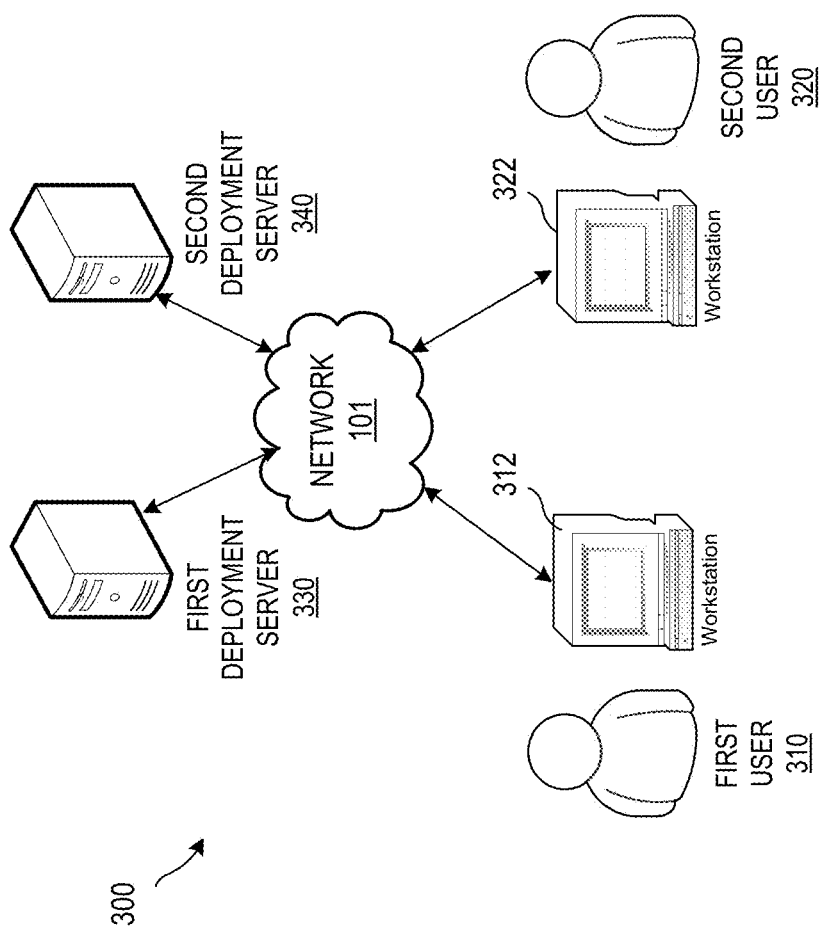
FIG. 3 provides a block diagram further illustrating a system and environment for providing roles based access in in accordance with various embodiments.

Referring now to FIG. 3, a block diagram illustrating a system and environment 300 for providing roles based access is provided. Included in the figure are the first deployment server 330, the second deployment server 340, a first user 310, the computing device or work station 312 of the first user 310, a second user 320, and the computing device or workstation 322 of the second user 320. The servers 330, 340 and computing devices 312, 322 are in communication with each other via network 101. Although the illustrated embodiment includes two deployment servers and two computing devices, it will be understood that any number of systems and devices can be included in the environment 300. In the illustrated embodiment, each client is configured to retrieve code from multiple deployment sources having different processes and schedules. For example, the deployment servers 330, 340 may each be associated with different teams, locations, objectives, organizations, products, and so forth.

The first user 310 and second user 320 each logs into a client using the computing device 312 and the computing device 322, respectively. Upon initiation of the login event, the first deployment server 330 and/or the second deployment server 340 identifies at least one role for each of the users 310, 320 based on the login information, and selects code and/or modules specific to the role. In other instances, the code and/or modules specific to each of the user's role are already stored locally on each of the computing devices 312, 322 upon login by the first user 310 and second user 320. In such instances, the first deployment server 330 and/or the second deployment server 340 can determine if updates, replacements, repairs, additions, deletions, or other modifications are needed when the first user 310 and/or second user 312 initiates the login event.

In other embodiments, the first deployment server 330 and/or the second deployment server 340 identifies and retrieves code and/or modules specific to an identified role for each login event and injects such codes/modules into a shell, which can be deployed to the computing device 312 and/or the computing device 322 and the data of the shell can be streamed or otherwise provided to the computing device 312, 322 from the server 330 and/or server 340. In additional embodiments, the role and/or codes specific to the role can be reconfigured, updated, and so forth at any time. For example, a new role can be created for the first user 310 upon login or a role can be reconfigured after and/or during the login event. In other examples, additional code can be added after the second user 320 has logged in such that new features or aspects of the system can be provided to the second user 320 as needed.

Figure 4:
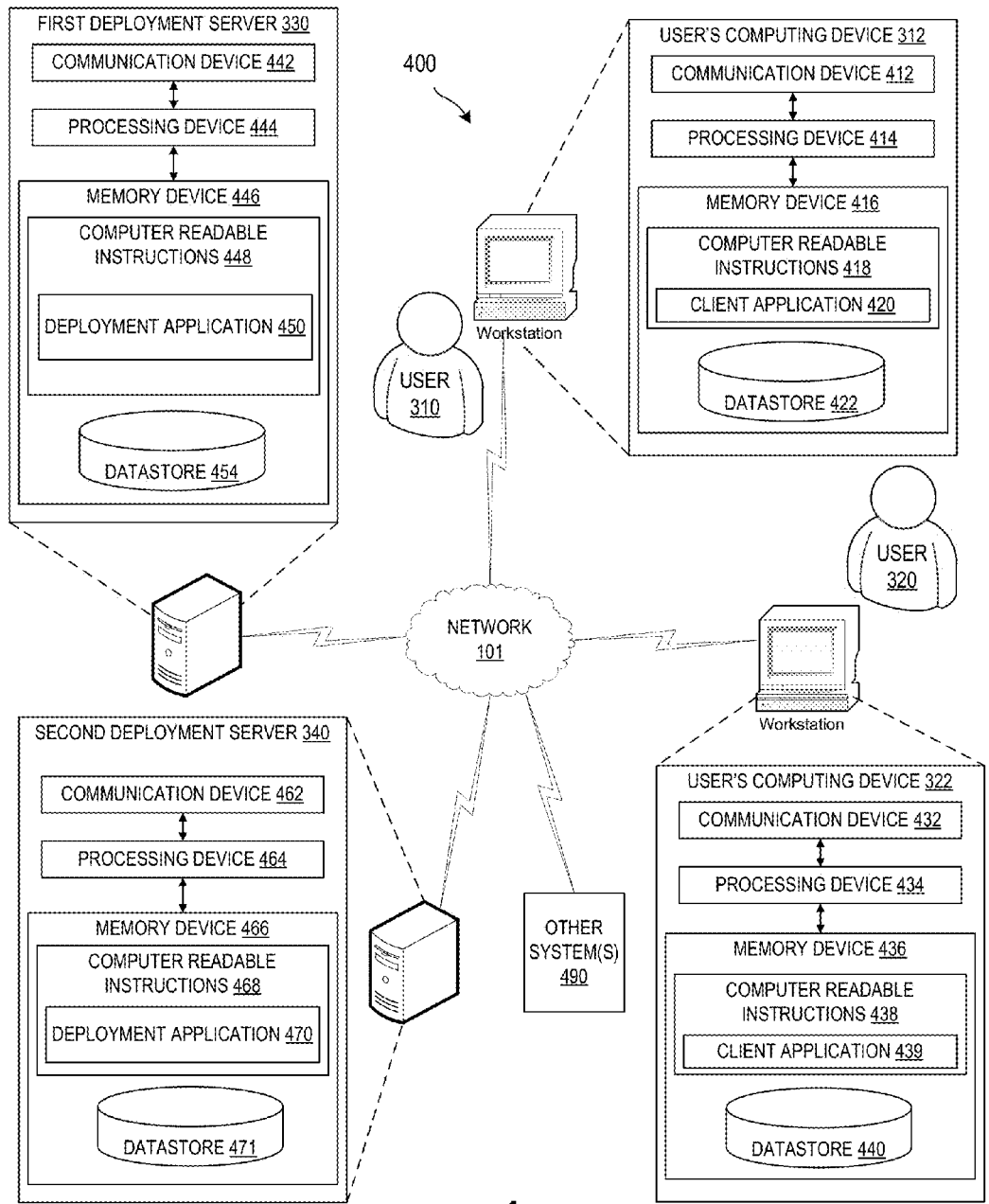
FIG. 4 provides a block diagram illustrating the first deployment server, the second deployment server, the first user's computing device, and the second user's computing device of FIG. 3.

Referring now to FIG. 4, a block diagram illustrates an environment 400 for providing roles based access. The environment 400 includes the first user's computing device 312, the second user's computing device 322, the first deployment server 330, and the second deployment server 340 of FIG. 3. The environment 400 further includes one or more other systems 490 (e.g., a partner, agent, contractor, other user, third party systems, external systems, internal systems, and so forth). The systems and devices communicate with one another over the network 101 and perform one or more of the various steps and/or methods according to embodiments of the disclosure discussed herein.

The first user's computing device 312, the second user's computing device 322, the first deployment server 330, and the second deployment server 340 each includes a computer system, server, multiple computer systems and/or servers or the like. The first deployment server 330, in the embodiments shown has a communication device 442 communicably coupled with a processing device 444, which is also communicably coupled with a memory device 446. The processing device 444 is configured to control the communication device 442 such that the first deployment server 330 communicates across the network 101 with one or more other systems. The processing device 444 is also configured to access the memory device 446 in order to read the computer readable instructions 448, which in some embodiments includes a deployment application 450. The memory device 446 also includes a datastore 454 or database for storing pieces of data that can be accessed by the processing device 444. In some embodiments, the datastore 454 includes domain tables, login data, roles data, rules, code, modules, and the like.

As used herein, a "memory device" generally refers to a device or combination of devices that store one or more forms of computer-readable media and/or computer-executable program code/instructions. Computer-readable media is defined in greater detail below. For example, in one embodiment, the memory device 446 includes any computer memory that provides an actual or virtual space to temporarily or permanently store data and/or commands provided to the processing device 444 when it carries out its functions described herein.

The first user's computing device 312 includes a communication device 412 communicably coupled with a processing device 414, which is also communicably coupled with a memory device 416. The processing device 414 is configured to control the communication device 412 such that the first user's computing device 312 communicates across the network 101 with one or more other systems. The processing device 414 is also configured to access the memory device 416 in order to read the computer readable instructions 418, which in some embodiments includes a client application 420. The memory device 416 also includes a datastore 422 or database for storing pieces of data that can be accessed by the processing device 414.

The second user's computing device 322 includes a communication device 432 communicably coupled with a processing device 434, which is also communicably coupled with a memory device 436. The processing device 434 is configured to control the communication device 432 such that the second user's computing device 322 communicates across the network 101 with one or more other systems. The processing device 434 is also configured to access the memory device 436 in order to read the computer readable instructions 438, which in some embodiments includes a client application 439. The memory device 436 also includes a datastore 440 or database for storing pieces of data that can be accessed by the processing device 434.

The second deployment server 340 includes a communication device 462 communicably coupled with a processing device 464, which is also communicably coupled with a memory device 466. The processing device 464 is configured to control the communication device 462 such that the second deployment server 340 communicates across the network 101 with one or more other systems. The processing device 464 is also configured to access the memory device 466 in order to read the computer readable instructions 468, which in some embodiments includes a deployment application 470. The memory device 466 also includes a datastore 471 or database for storing pieces of data that can be accessed by the processing device 464.

In some embodiments, the client application 420 and the client application 439 interact with the deployment application 450 and/or deployment application 470 to provide roles based access to clients and/or systems associated with the computing devices 312, 322.

The applications 420, 439, 450, and 470 are for instructing the processing devices 414, 434, 444 and 464 to perform various steps of the methods discussed herein, and/or other steps and/or similar steps. In various embodiments, one or more of the applications 420, 439, 450, and 470 are included in the computer readable instructions stored in a memory device of one or more systems or devices other than the systems 330 and 340 and the users' computing devices 312, 322. For example, in some embodiments, the application 420 is stored and configured for being accessed by a processing device of one or more third party systems (e.g., the other systems 490) connected to the network 101. In various embodiments, the applications 420, 439, 450, and 470 are stored and executed by different systems/devices are different. In some embodiments, the applications 420, 439, 450, and 470 are stored and executed by different systems may be similar and may be configured to communicate with one another, and in some embodiments, the applications 420, 439, 450, and 470 may be considered to be working together as a singular application despite being stored and executed on different systems.

In various embodiments, one of the systems discussed above, such as the first deployment server 330, is more than one system and the various components of the system are not collocated, and in various embodiments, there are multiple components performing the functions indicated herein as a single device. For example, in one embodiment, multiple processing devices perform the functions of the processing device 444 of the first deployment server 330 described herein. In various embodiments, the first deployment server 330 includes one or more of the external systems and/or any other system or component used in conjunction with or to perform any of the method steps discussed herein. For example, the first deployment server 330 may include a financial institution system, a credit agency system, and the like.

In various embodiments, the first deployment server 330, the second deployment server 340, and the users' computing devices 312, 322 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 500, the other methods discussed below, or other methods, processes or steps discussed herein or not discussed herein.

Figure 5:
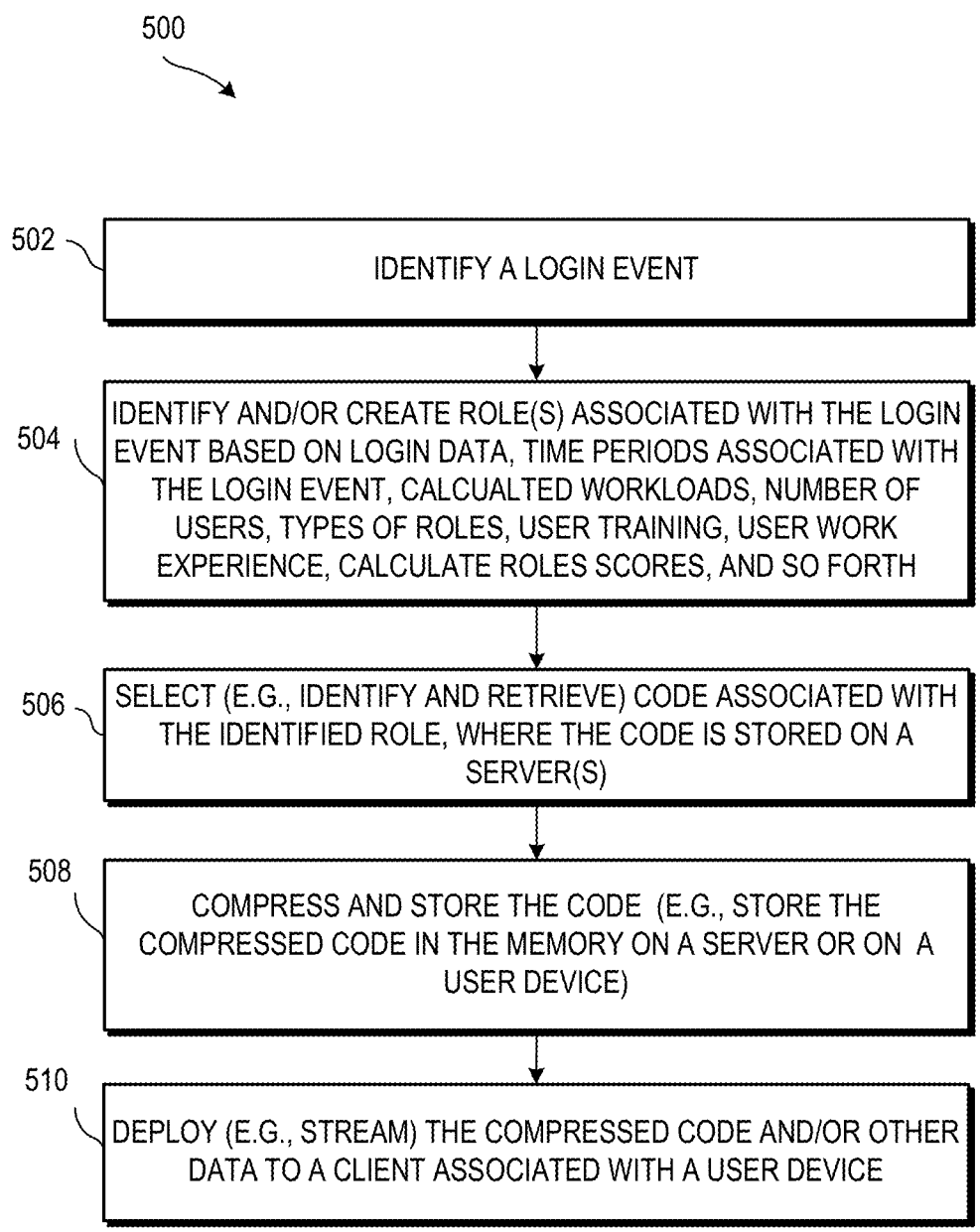
FIG. 5 is a flowchart illustrating a system and method for providing a roles based access system.

FIG. 5 illustrates a flowchart providing an overview of a process 500 for providing roles based access to a user accessing a client. One or more devices, such as the one or more devices and/or one or more other computing devices and/or servers of FIGS. 1-4, can be configured to perform one or more steps of the process 500 or process 600 described below. In some embodiments, the one or more devices performing the steps are associated with a financial institution. In other embodiments, the one or more devices performing the steps are associated with a merchant, business, partner, third party, credit agency, account holder, and/or user. As provided herein, it will be understood that the process of FIG. 5 is merely an exemplary embodiment and that the various steps of process 500 can be conducted in any order.

As illustrated at block 502, a login event is identified. In some embodiments, credentials such as a user name, an employee number, passcodes, identification, information related to security features, biometric data, work matter numbers, or any other data inputted by a user or associated with a login event is received. The login event may be automatic, manual, or a combination thereof. For example, the system of process 500 may receive data in real time when a user enters an employee number, a known passcode, a randomly generated code, a work matter number and/or work account code to login to a system via a client application associated with their workstation or computing device. The credentials inputted by a user during a login event may be shared and/or unique. For example, the user may have user identification or a password that includes a nine character sequence, where the first five alphanumeric characters (e.g., "team2") are shared with other users that are in the same group or business unit as the user, and where the last four digits of the user identification or password are unique to each user. User 1 of one business team may have a user ID of "team2BJ8x" and User 2 of the same business team may have a user ID of "team279oM." In other examples, the type of credentials, number of credentials, security levels (e.g., question screens, text input, biometric input) required during the login event may be based on the job title of the user, the workflow of the user, the employment length of the user, the experience of the user, and so forth. A user that works on highly regulated accounts or that has access rights to a large amount of sensitive data may be required to go through a more strenuous login process than a lower level employee. In some embodiments, the login even is identified based on the received credentials inputted by the user.

As illustrated at block 504, a role associated with the login event is identified and/or created. The role may include one or more roles associated with one or more users. As used herein, a "user" refers to but is not limited to an employee, an associate, a customer representative, an operator, an analyst, an administrator, and the like. In some embodiments, the user is associated with a financial institution or other financial or business entity. For example, the user may be an account specialist, an administrator, a manager, a team leader, a trainer, a trainee, and the like. The user, in some embodiments, is associated with a particular job function, type of account, team, line of business, group, and the like.

In some embodiments, the role is identified based on login data such as user credentials, IP addresses, device or workstation identifications, and so forth. For example, a user name or an employee number inputted by a user during login may be matched with a role, e.g., a particular job function. In other embodiments, the role is identified based on a time period of the login event, a login event history associated with a user, frequency of login, total number of time the login has been used, sequence of data input during the login event, type of data inputted at login, and the like. If a user has signed into their workstation system only five times in the last two weeks, for example, their role may be identified as a trainee. In other examples, if a user is required to input three different types of credentials (e.g., a known passcode, a randomly generated pass code, and a retina scan or fingerprint reading) or clear multiple sequential security levels during the login event, the system of process 500 may determine that the user's role is associated with a particular group, or that the user's role includes a leadership position.

In alternative or additional embodiments, the user is prompted to enter data to identify the role or verify an identified role. The user may enter an employee number corresponding to a role, describe their job function, confirm that the identified role is correct, answer predetermined questions, and the like. For example, a user may be prompted to input or select a type and/or length of training in specific areas, length of employment, current and past job titles, and so forth. Based on the user input, the system of process 500 can identify all roles associated with the user and/or login event. In this way, the user's role may be switched, a new role created, or the code and other application data modified at any time in order to meet changing needs.

In further embodiments, a role associated with the login event is dynamically created. Upon initiation of the login event, after the login event, before the login event, or after the user has logged off, for example, a new role or modified role may be created for a particular user associated with the login event. In this way, the system of process 500 allows administrators or authorized personnel to build new roles and configure the roles in a dynamic fashion without technical intervention. Further, as detailed below, roles based applications can be built and modified easily without technical assistance. For example, if the system of process 500 determines that there are already an adequate number of car loan representatives signed into the system, a user associated with the login whose role is usually car loan accounts may be assigned to a new role in savings accounts. The system can determine that adequate coverage is available for workloads based on calculations and ranges related to incoming call wait times, duration of calls, amount of required user input, number of queues, length of queues, type of products, and the like. If the number of waiting calls associated with a particular role has dropped by 15% every 10 minutes during the last hour from a peak amount, the system can determine that some users can be directed to different workflows and job functions. In other cases, the average amount of time required to complete a certain task (e.g., calling a customer, talking with the customer, evaluating data, and/or inputting data) can be calculated to determine the total number of users needed to handle a certain number of tasks or the amount of time needed for a certain number users to complete tasks. Some tasks such as calling joint account owners where each owner has multiple alternate phone numbers and where the terms of a complex financial product must be approved by each owner may take longer than other tasks such as updating an account balance or calling a single account owner to confirm a purchase transaction. In another example, if the percentage of complex or time consuming tasks (e.g., tasks taking more than 5 minutes or tasks that require the user to have certain expertise) falls below 34% of the total number of tasks, a certain number of users may be diverted to other roles.

In other examples, if the system of process 500 determines that more retirement account associates are needed during a particular time of day or other period of time, a user associated with a login event whose role usually encompasses insurance may be switched to a retirement account role. The roles of the user can be switched back and forth as needed. In still other examples, the creation of the new role may be based on previous or current training, experience, workflow, or job titles associated with the user of the login event. For example, if the user credentials inputted during login can be used to look up training programs completed by the user and match the user with a particular role. In some cases, the type of training or experience may be weighted. Roles that involve more complex workflows or roles that require a higher level of expertise than less demanding roles may be more heavily weighted. In other cases where there are fewer users that have mutual funds account experience than users with credit card account experience, training values or experience amounts for roles directed to mutual funds may be given more weight than roles directed to credit card accounts. For example, the number of mutual funds training modules performed by a user or total hours of mutual funds training/work experience can be multiplied by a first factor (e.g., 1.0) and the number of credit card account training modules or total hours or training/work experience may be multiplied by a smaller factor (0.43) in calculating a role score. In situations where all the roles are the same or similar (e.g., all online users have shared user names), the user having the most training or experience will have the highest role score. The role score associated with each login event or each user can be used to determine whether a new role should be created. If 20% of all login events are associated with a role score of less than 10, for example, then new roles having scores in the 11-20 range may be created.

Additionally, newly created roles can include hybrid roles that encompass two or more roles or portions thereof. For example, hybrid roles can be created based on user training and/or experience in multiple roles, time period and duration of the login event, experience level, types of products, customers, and so forth. If the login event occurs during a weekend or holiday, a hybrid role may be created that encompasses workflow and job functions for multiple business units or other support not available during the weekend or holiday. In other cases, periods having historically high work volume such as tax season, mornings, or weekdays may require a higher percentage of hybrid roles in order to cover the large work volume. In additional examples, certain products such as VIP accounts may require that the user have specialized knowledge or knowledge in many different areas. In such cases, hybrid roles may be created to address such situations.

As illustrated at block 506, code associated with the identified role and stored on one or more servers is selected. The code includes, for example, instructions for performing any number of actions such as role specific actions. Although code is illustrated in FIG. 5, it will be understood that any type of data may be used in the process 500. Exemplary role specific actions include modifying account data, calculating interest rates, adjusting account balances, performing searches, creating calling queues to reach customers or account holders, providing rule specific notifications, linking to external website, and so forth. The application, in some embodiments, includes a client or other application configured for a specific role. For example, the application includes the format, tools, data fields, databases, and other features that enable the user to perform the job functions of the identified role.

The system of process 500, in some embodiments, includes the one or more servers. In other embodiments, the one or more servers are separate from the system of process 500. The code, in some embodiments, is identified and retrieved from databases of the one or more servers. In further embodiments, only the code associated with the identified role is selected. For example, a database containing code for multiple roles may be searched, and code not related to the identified role may be filtered out such that only code associated with the identified role is selected.

In some embodiments, the code and/or modules associated with the identified role is stored in a shell or file folder. For example, upon occurrence of the login event, the system of process 500 retrieves data content of a particular shell associated with the identified role. Each role, for example, may correspond to a shell that has specific modules, code, and other data stored therein such that when the user logs into his or her workstation, the system of process 500 retrieves the contents of the shell associated with the identified role. In other cases, a database containing various code and modules may be searched to retrieve only the codes and modules related to the identified role, and the selected code and modules can be injected into a shell.

In further embodiments, the code or modules associated with a particular application are selected based on domain tables. The domain tables allow the system to identify what code is available, the features associated with an application, access rights, custom application behaviors, available third party applications, and the like. Based on the identified role, features of a selected module can be turned on or off to customize application behaviors. In this way, the application can be customized by selecting specific variables in the domain tables. In other embodiments, the code is selected based on past deployment events associated with the identified role. For example, if code related to one state's specific calling volume load requirements is streamed to an application associated with the identified role every Monday-Thursday and code related to a different state's specific calling volume load requirements is streamed to the same application on Fridays, then the system can determine the state specific code needed on a Monday login for the identified role. In further embodiments, code or modules are selected based on roles associated with other login events, other users, or other groups. For example, in creating a new role, an administrator may select code for roles that are different or separate from the identified role to build the application.

In additional embodiments as detailed herein below, the system of process 500 determine if the modules and code associated with the identified role are up-to-date. If data is missing or if there are errors or unwanted features for a particular role based application, authorized personnel such as an administrator can easily add or delete code or modules to modify or build up an application for the identified role based on current needs.

As illustrated at decision block 508, the selected code is compressed and stored. The compressed code may be stored remotely on a server, locally on the user's device, or a combination thereof. Instead of all code being stored locally on the user's computing device, only roles based code or a portion of the roles based code is stored. In other cases, the selected code or a portion of the selected code may not be stored on the user's computing device, and may instead be stored at a server and streamed down to the client application.

As illustrated at block 510, the compressed code and/or other data is deployed to a client associated with a user's device. In some embodiments, the compressed code is streamed, uploaded, or otherwise provided to the client on the user's computing device. In some embodiments, at least a portion of the compressed code or other data associated with the identified role is universal to all or most users of the system. For example, all users may have access rights to certain tools, features, or other aspects of the system. In other cases, some portions of the selected code may be unique to a particular user or subset or users.

Figure 6:
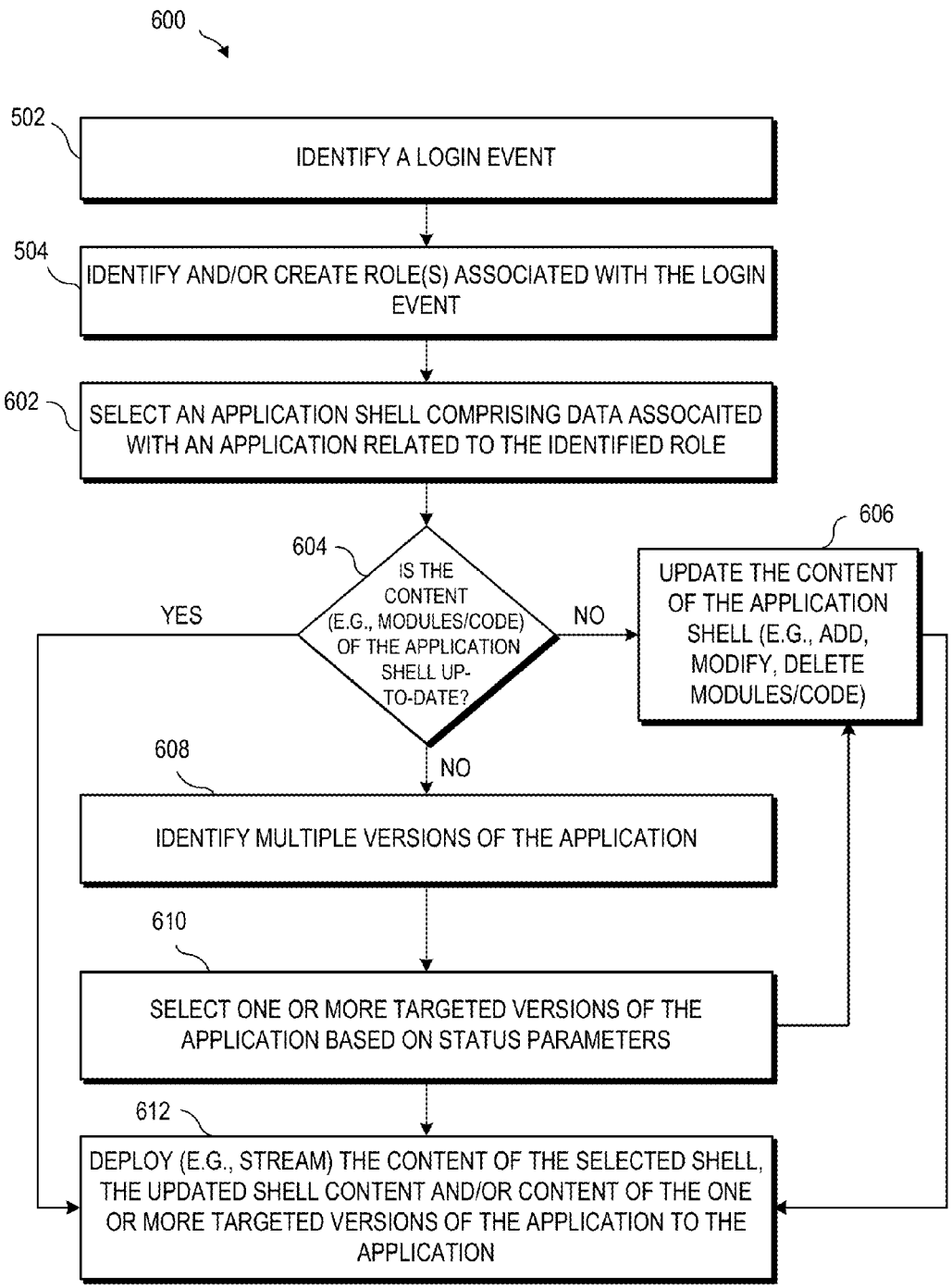
FIG. 6 is a flowchart illustrating a system and method for providing a roles based access system in accordance with various embodiments.

Referring now to FIG. 6, a process 600 for providing roles based access is illustrated in accordance with some embodiments of the disclosure. As illustrated at block 502 and as discussed above, a login event is identified. As illustrated at block 504 and as discussed above, a role or a plurality of roles associated with the login event is identified and/or created.

As illustrated at block 602, an application shell comprising data associated with an application (e.g., a client) related to the identified role is selected. The application shell further includes, for example, code, modules, domain tables, login data, registration data, and other application data as well as non-application data. In further examples, the content of the application shell may include current application data, past application data (e.g., past downloads, updates, patches, application versions, login history, and so forth), future application data (e.g., scheduled updates), and the like. In some embodiments, the content of the application shell includes only data associated with the identified role. The application data may only include codes, modules, and other data that is needed for an application in the identified role such that the user can carry out specific duties of the identified role. The role specific application data enables the application to be specifically molded to the identified role.

As illustrated at decision block 604, a determination is made as to whether the content of the application shell is up-to-date. It will be understood that the determination at block can occur at any time. For example, it can occur concurrently with the login event (e.g., 10 seconds after login is initiated), before the login event, after the login event, or after a logout event has occurred. In some embodiments, the determination of the status of the application content is based on one or more status parameters. The status parameters include, for example, time periods, scheduled updates, bug/error detection, security failures, application performance analytics, login credentials, role or user specific application data history, application data comparisons, role data, user productivity metrics, and the like.

A determination as to whether or not the shell content requires updating may be based on the time period of the login event, the length of time, a user's date of employment, or the date of the last shell content update. The time and date of login or the amount of time a user has been logged into the system can be used to determine if the shell content should be modified due to seasonal factors such as tax season/holiday season, time period dependent workloads, or new product release dates. Login events that occur during the busiest time of the day or month may require more frequent refresh or data resets than slower periods due to increased data loads. In such cases, the system of process 600 may estimate update frequencies and schedule updates accordingly. In other cases, the login time periods may be used to determine that shell content modifications should be implemented at a later time to avoid delays. Further, the time periods associated with logins may also be used to determine if the shell content is due for a previously scheduled update. In other examples, login credentials indicating a date of employment may be used to determine the user's skill level, proficiency, and areas of expertise in order to determine type of updates and/or frequency of updates. New employees may require certain training modules and notifications, and may have different tools and features available to them than more experienced employees. For example, trainees may receive more cautionary notifications than seasoned employees, and may be prompted to enter specific reasons for overriding a caution. Also, the trainee's reasons for the override may be given heightened scrutiny or the reasons may have to be approved before the user can proceed.

In further embodiments, previous, current, or predicted errors, bugs, security breaches, and the like can be used to determine if the shell content is up-to-date. For example, if similar applications or applications that have the same of similar features as the instant application have recently failed due to bugs or bad code, the system of process 600 can determine that the same modifications that were made to the similar applications or more vigorous changes are required to offset any potential issues. In additional embodiments, application or system performance analytics such as connection speed, error counts, data processing speeds, load times, launch times, and the like can be measured to determine whether or not modification to the shell content would be beneficial. In some cases, the system performance analytics may be related to user performance. For example, if a user has recently taken longer to complete certain tasks compared to past performance or compared to performance of other users, the system of process 600 may determine that such changes in performance is due to slower connection speeds, bugs in the programming, cumbersome screen set-ups, too many unnecessary notifications, and so forth. In such instances, it can be determined that updates to the shell content are needed. The updates may include, for example, automated field fill-ins, window or data field restructuring, user input guidance, bug corrections, and so forth. In other cases, the system of process 600 can determine that user job function performance is related to changes in workloads, products, customer demographics, law, performance evaluation methods, and the like. The system 600 may determine that changes to the shell content should be implemented to reflect such changes. For example, if a financial institution changes its credit card account policy, certain fields of data may need to be added to or deleted from the user's screen to reflect the changes in the policy.

As illustrated at block 606, the content of the application shell is updated if the content is determined to be outdated. For example, data may be deleted, added, modified, rewritten, and so forth. Certain application behaviors may be switched on or off (activated or inactivated). In some embodiments, the updates are universally implemented such that all applications of the system get the same update, or the updates may be role specific, user specific, or group specific. For example, interest rate calculation updates may be applied to all applications for a payment recovery account team, but not updated for savings account team. In still other examples, the updates may be user specific or specific to certain login credentials. For example, an operator with a disability may require certain audio or keyboard features that are not applicable to other users. In some embodiments, the type and features of the update are identified based on diagnostic data and the status parameters discussed above.

The timing of the update can vary based on the type of update, the number of updates, the length of time needed to complete the update, and the effect the update will have on the application or the user's performance. For example, if the update requires a reboot of the user's computing device or a shutdown of the application, the update may be delayed until after the user has logged out of the system. Also, if the update will cause the user's screen to freeze or otherwise slow down the application or the user's computing device, the update may also be delayed. Even if it is determined that the update causes system delays or other undesired affects, such updates may still be implemented at once or sooner than would otherwise be expected if the updates would result in faster application processing speeds or user performance such that the downtime of the update is offset by the increases in performance. In still further embodiments, the updates may be automatic or implemented at once based on the type or cause of the update. For example, updates related to fixing or preventing account issues, changes in law, increasing customer satisfaction, or security may be implemented soon or immediately after such updates are identified.

In some embodiments, an update notification is provided to the user. For example, a pop-up message, email, text, or other communication may include details about new tools or client features available to the user and may provide instructions to log out of the system and log back into the system so that the new features can be installed. For example, if a user opens a tool to calculate an amortization rate using an old version of the tool, the user may be notified that a new version of the calculator is available when the user opens the calculator. In other examples, the update notification may be provided automatically whenever updates are available regardless of the user's activity and at any time. In cases where the update includes a new role for the user or a switch in roles, the instructions may designate the role to choose when the user logs back in or a new user name or other login credentials to input when logging back into the system. In other cases where the update to the system is deemed mandatory or critical, a notification prompting the user to immediately shut down and log back in may be provided. In still other cases, the system may present a timer indicating when the system will shut down and reboot.

As illustrated at block 608, more than one version of the application is identified if it is determined that the content of the application shell is not up-to-date. And as illustrated at block 610, one or more targeted versions of the application is selected. In some embodiments, the targeted version of the application is selected based on domain tables, identified role, time periods, application attributes, user or user device location, historical data, changing needs, reported issues, and so forth.

For example, the system of process 600 may associate certain identified roles with various stages of training such that a user at a first stage of training may have version one of a pilot program, while a user that is at a higher stage of training may have version two of the same pilot program. In some embodiments, the user's stage of training is determined based on the user's date of employment, the user's group, work hours, certifications, login data, and so forth. If the user has logged in using a training ID, the system can calculate the total amount of time the user has been logged into the application with that training ID to determine the user's state of training. In other examples, a product development group may require that all members of the group complete training related to a new procedure or product. All member of such a group may be provided with a training module upon login. In some cases, as each user having the identified roles completes a training module, the version of the pilot program may be changed. For pilot programs, training modules, and other applications that have multiple versions, the targeted version of the application may be applied to various devices associated with particular roles on a rolling basis. In other instances, the process 600 enables the system to quickly revert back to previous versions of the application as issues arise or skip over subsequent versions of the application.

In further embodiments, the targeted version is based on location data. For example, a group of users or devices associated with a particular set of roles located on a top floor of a work site may have a different version of an application than the version of the same application used by one or more users located on a lower floor due to differences in seniority, specialties, work schedules, amount of experience, and so forth. In another example, identified roles associated with users in one state may have a different version of the same of similar application than identified roles associated with users in another state due to differences in state law, time zones, and the like.

In other embodiments, the targeted version is selected based on application attributes. Some application features of particular roles may include, for example, certain rules, fields, queues, tools, and so forth. For example, some rules related to transfers, account balances, interest rates, and the like may be prone to change and may require reconfiguration or new code due to market fluctuations and account activity. In other embodiments, the targeted version is selected on account types, customer types, product types, time periods, and so forth. For example, one version of the application may be used for new customers and a different version of the application may be used for customers that have owned a financial product for over two years. In other examples, a version of the application for use during the morning may be different from another version of the application for used during the afternoon or evening. If the likelihood of contacting a customer is higher between the hours of 6 PM and 8 PM, the screen format or number of work tasks may be optimized for a large workload for applications used during the evening than those used during the early afternoon. For example, the screen may be set at a lower zoom level or more training notifications provided for applications used during the hours of 1 PM and 5 PM than for applications used during the evening because a larger amount of data may be sifted through or less input may be needed during a low work load period.

In further embodiments, a second targeted application is identified. For example, as the user progresses in stages of training, the next version of the application may be selected. In other examples, the system of process 600 may require another version or new version of an application as security features are implemented, screen formats change, new tools are added, and the like. In other embodiments, the system of process 600 may determine that the original version of the application is needed. For example, as workloads diminish or increase, the work day progresses, or issues arise, the system of process 600 may revert back to a previous version of the application.

As illustrated at block 612, the content of the selected shell, the updated shell content, or the content of the one or more targeted versions of the application is deployed to the application. In some embodiments, the content of the selected shell is deployed if it is determined that the content of the selected shell is up-to-date. In other embodiments, the updated shell content and/or the content of the one or more targeted versions of the application are deployed even if it is determined that the content of the selected shell is not up-to-date. For example, the system of process 600 may deploy shell content that has not been updated if deploying updated content would slow the load time. In such cases, only certain basic block of the application may be deployed during the login event, and updated content may be deployed subsequently.

The deployment (and/or other steps of processes 500 or 600) may occur substantially simultaneously with the login event, after the login event, during the login event, before the login event, or even during or after a logout event. In some cases, one or more of the steps of process 600 occur nearly simultaneously with the login event such that code is deployed every time the user logins into the application. In other cases, some of the steps of process 600 occur before the login event. For example, the system of process 600 may estimate the time at which the user is expected to log into the application such that updates may be checked and/or code or modules uploaded to the user's computing device up to an hour before the login event.

Figure 7:
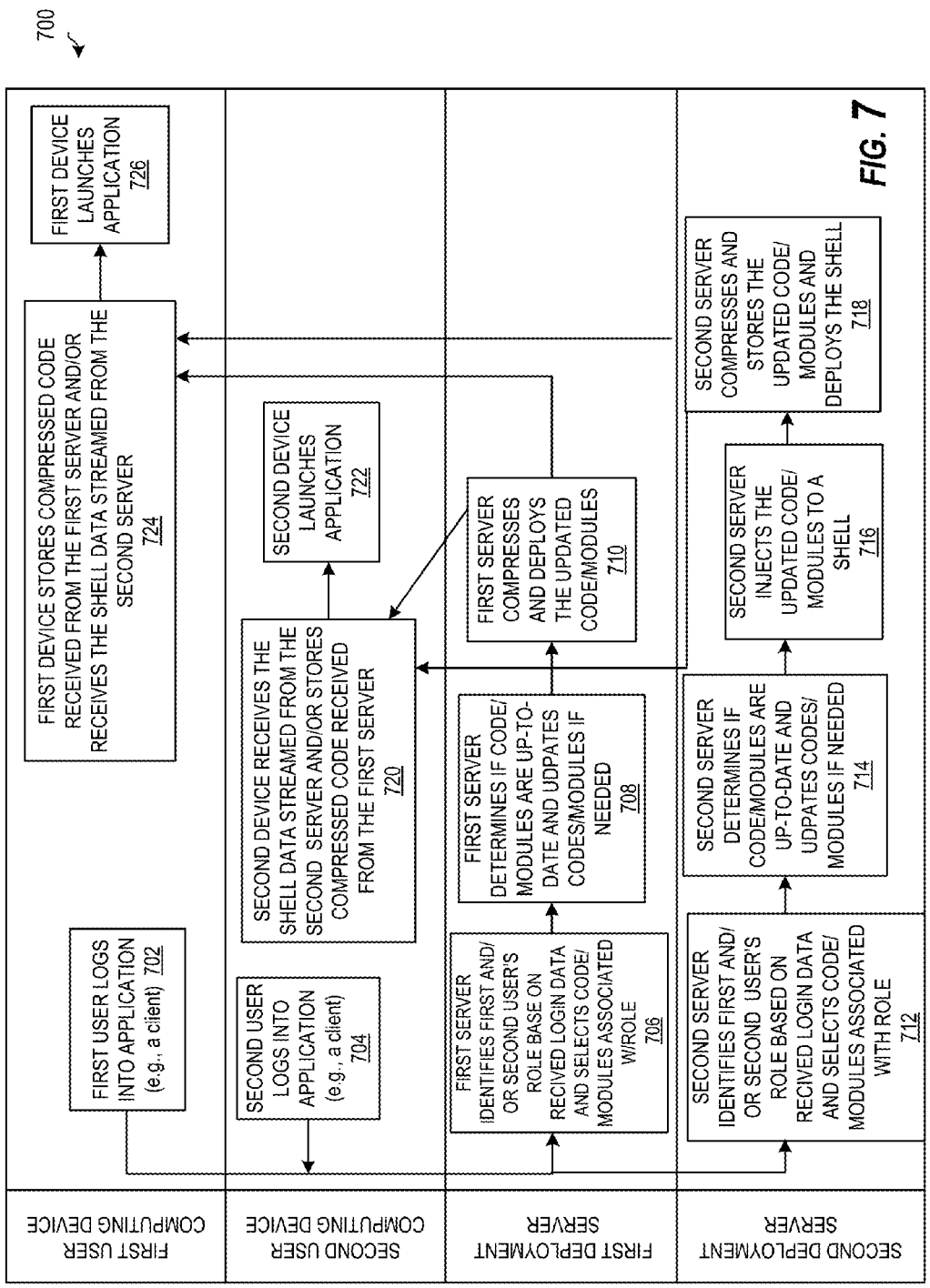
FIG. 7 is a block diagram illustrating a system and process for providing roles based access in accordance with various embodiments.

Referring now to FIG. 7, a block diagram illustrating a system and environment 700 for providing roles based access to an application on one or more user devices is provided. In the illustrated embodiment, the system 700 includes a first user computing device, a second user computing device, a first deployment server, and a second deployment server (e.g., the device and system of FIGS. 3-4). The various devices and servers are in communication with each over a network (e.g., the network 101 of FIGS. 3-4). Although the illustrated embodiment shows two computing devices and two deployment servers, it will be understood that any number of devices and servers can be used.

As illustrated at blocks 702 and 704, each of a first user and a second user logs into an application such as a client stored on the first or second user computing device. For example, the first and second users may input employee numbers, passwords, user names, biometric data, randomly generated code, and so forth.

As illustrated at block 706, the first deployment server identifies the first and/or second user's role based on received login data and selects code and/or modules associated with the role. For example, the first or second user's employee number or group identification inputted at login may be matched to a specific role.

As illustrated at block 708, the first deployment server determines if the selected codes and/or modules are up-to-date and updates the codes/modules if needed. As detailed hereinabove, the up-to-date determination can be based on status parameters, which include time periods, scheduled updates, bug/error detection, security failures, application performance analytics, login credentials, role or user specific application data history, application data comparisons, role data, user productivity metrics, and the like. The updates include not only modifications to the application such as added code, deleted code, modified code, and the like, but also changing the version of the application to be deployed to the users' devices. For example, the applications associated with the first user computing device and/or second user computing device may be upgraded to a newer version of the application, reverted back to a previous version of the application, and so forth.

In some embodiments, the first deployment server and/or second deployment server updates the code or other data of the client while the first user and/or second user is logged into the system. In such cases, the user may be prompted to log off the system and log back into the system in order to receive the updates. For example, a pop-up message indicating new features or tools that may be provided to the first user or second user if the user logs off and logs on may appear on the user screen. In other cases, the user may be forced to log off or the log off may be automatic for updates that are deemed pertinent or important.

As illustrated at block 710, the first deployment server compresses the updated (or selected) codes and/or modules and deploys the codes and/or modules and any other application data to the first user computing device and/or second user computing device. In the illustrated embodiment, the first server sends the compressed data to the first user computing device and/or second user computing device so that the compressed data can be stored in the memory of the devices.

As illustrated at block 712, the second deployment server identifies a role associated with the first user and/or second user based on the received login data, and selects code and/or modules associated with the selected role. As detailed above, the role may be identified based on login data, time period of the login event, a login event history associated with a user, frequency of login, total number of times the login has been used, sequence of data input during the login event, type of data inputted at login, and the like.

As illustrated at block 714, the second deployment server determines if the selected codes and/or modules are up-to-date and updates the codes and/or modules if needed. As detailed hereinabove, the up-to-date determination can be based on status parameters and the update to the codes, modules, and/or application includes modifications to the application and application version changes.

As illustrated at block 716, the second deployment server injects the updated code and/or modules (or selected code/modules if no update is needed) to a shell. For example, the selected code or updated code may be placed in a file folder located in the second deployment's database.

As illustrated at block 718, the second deployment server compresses and stores the updated (or selected) code and/or modules and deploys the shell. In the illustrated embodiment the second deployment server compresses the code or data injected into the shell and store the compressed data, and streams or otherwise provides the data from the shell to the first user computing device and/or second user computing device. In this way, there is no need to store all of the application data on the first user computing device and/or second user computing device.

As illustrated at block 720, the second user computing device receives the shell data streamed from the second deployment server and/or stores the compressed code and/or modules received from the first deployment server. For example, the core components of the application such as certain tools or weblinks that are common to all applications may come from one deployment server, other more specific data such as role specific data may be received from a different deployment server, and/or updates or pilot versions of the application may come from still another deployment server.

As illustrated at block 722, the second user computing device launches the application. In some embodiments, the second deployment device launches the application after or upon receiving the data from the first deployment server and receives the updated data from the second deployment server after the application is launched. For example, the first deployment server may send only the data necessary to launch the application and perform the tasks of the role to the second user computing device for storage, and the second deployment server may provide updates to the application as needed. In other embodiments, all selected and/or updated code or other data is provided the second user computing device before the application launches, and updates are provided after the application launch as needed.

As illustrated at block 724, the first user computing device receives the shell data streamed from the second deployment server and/or stores the compressed code and/or modules received from the first deployment server. And as illustrated at block 726, the first user computing device launches the application.

Figure 8:
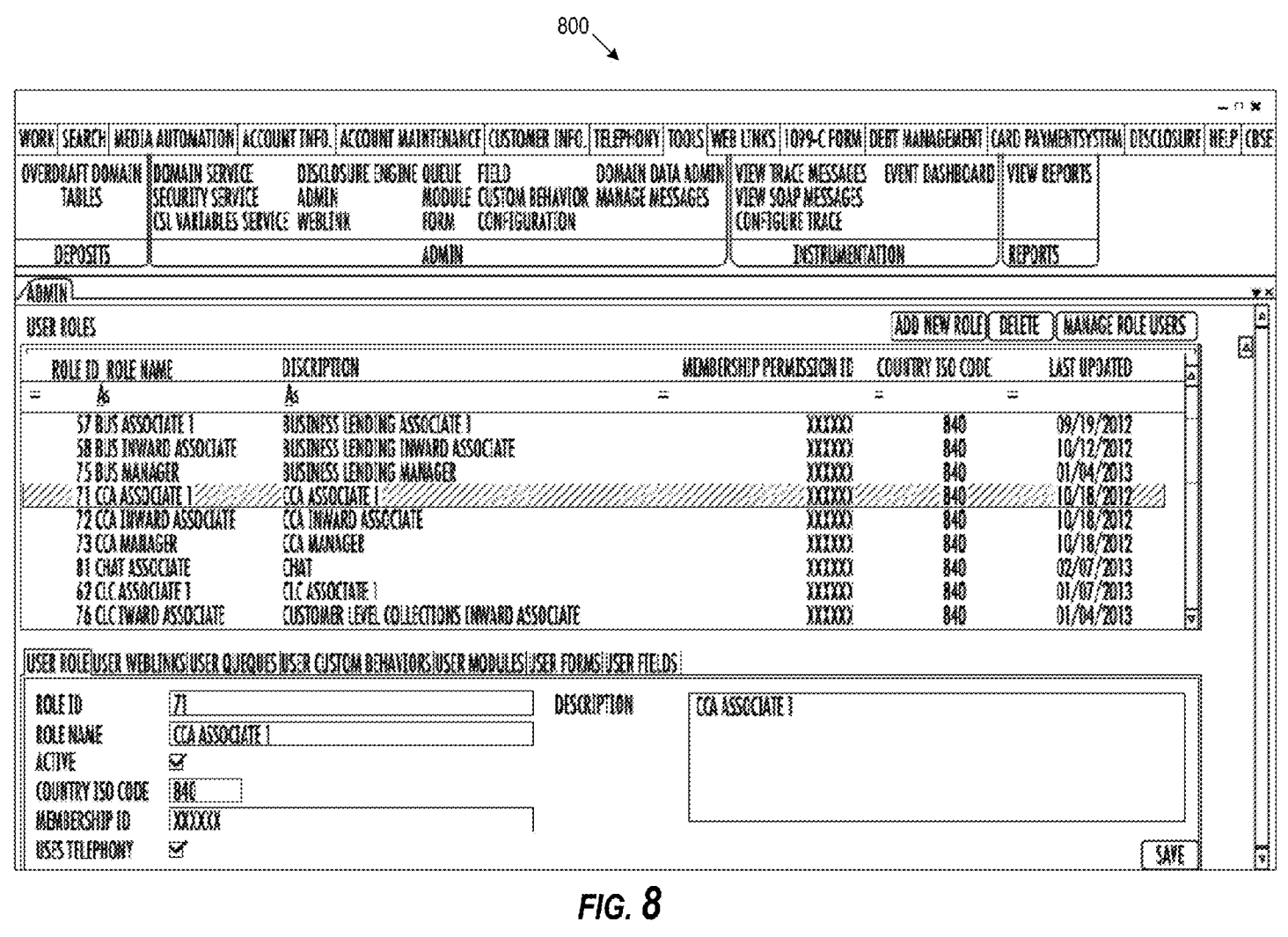

FIGS. 8-13 illustrate screen shots of a graphical user interface (GUI) of a system 800 for manipulating roles based access. Although the exemplary embodiments in FIGS. 8-13 related to collections, it will be understood that the system 800 can be used for any purpose. The system 800 can be utilized by an administrator or other authorized personnel to create new roles, reconfigure the user's client, switch application versions, push updates, and so forth. In the illustrated embodiment of FIG. 8, the administrator selects a "Tools" tab to access various ribbons labeled "Deposits," "Admin," "Instrumentation," and "Reports." Under the Admin ribbon, the administrator can select the "User Role" tab to access a table of roles. In FIG. 8, a consumer associate, "CCA Associate 1," is selected and details of the user are displayed such as the role identification, role name, active status, country ISO code, and membership identification. In some embodiments, the login credentials comprise the membership identification of the user. In this way the features of the client are deployed when the consumer associate logs into the system.

Further, the administrative user can create a new role be selecting the "Add New Role" button. The administrator can fill in the details of the role by entering the role name, active status, country ISO code, and membership identification to save the new role, and may also use the other tabs such as the "User WebLinks" tab to configure various aspects of the client for the new role. The system 800 also allows the administrator to select a role and delete that role if wanted. In other cases, the administrator can click the "Manage Role Users" button to update various features associated with a selected role as detailed below.

Figure 9:
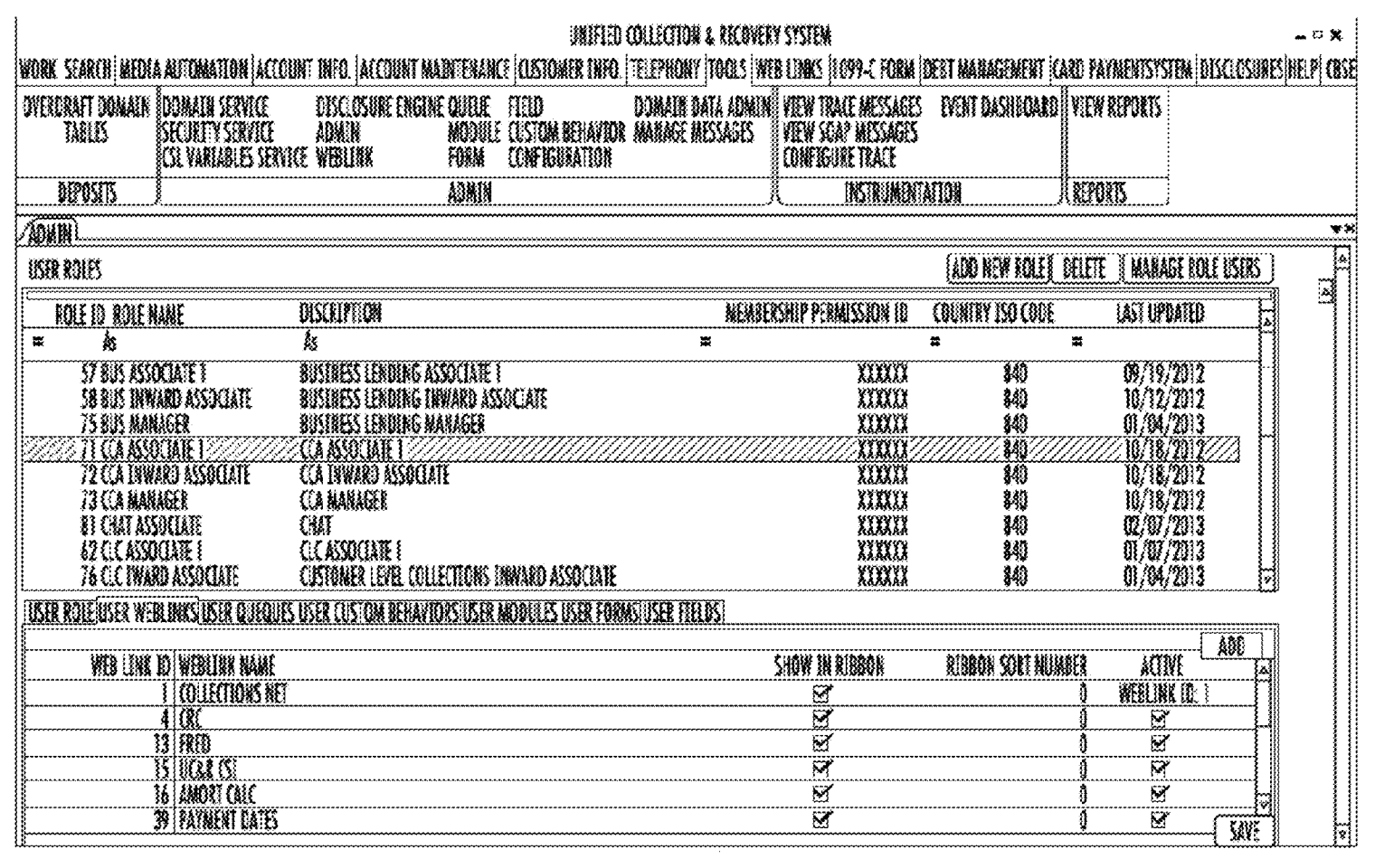

As shown in FIG. 9, the "User WebLinks" tab display includes a list of intranet or internet tools that are available for a selected role (e.g. the CCA Associate 1 of FIG. 8). The names of the WebLinks (e.g., web tools for a total net amount of collections, cyclic redundancy check (CRC), amortization calculations, and the so forth), the WebLink ID, the ribbon status, the ribbon sort number, and the active status of each WebLinks is provided in the WebLinks tab window. Additional WebLinks may be added by clicking the "Add" button and selecting a WebLink to add and then clicking the "Save" button.

Figure 10:
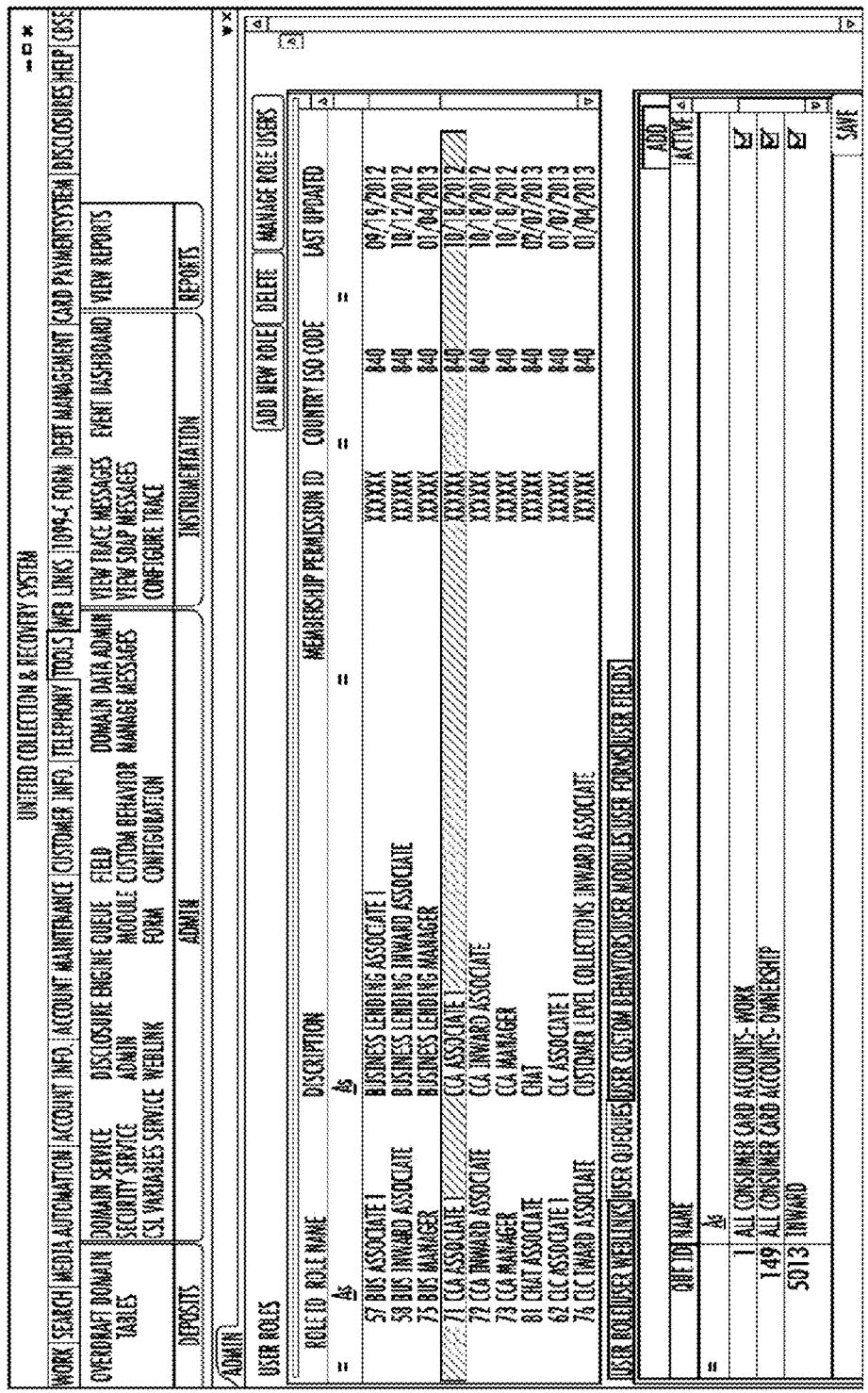
FIG. 10 is an illustration of a graphical user interface for manipulating roles based access for a user in accordance with various embodiments.

In FIG. 10, the "User Queues" tab provides a list of all queues available to the user. A "queue" is a listing of accounts that are associated with a dialing campaign. The queue may be based on various filtering, sorting, and calling mode criteria. For example, calling velocities, time zones, and state or federal law requirements may be taken into account when filtering and sorting queues. In the illustrated embodiment, the "all consumer card accounts" designated as "work" include calling campaigns where an automated dialing mode is instigated. The all consumer card accounts designated as "ownership" includes calling campaigns where the consumer associate (i.e., CCA Associate 1) has some ability to be flexible and determine the order in which the customers will be dialed. The "Inward" queue includes dialing campaigns that include inward calls, i.e., calls received from customers. The types and number of queues can vary depending on the job functions, experience, or training associated with the role.

Figure 11:
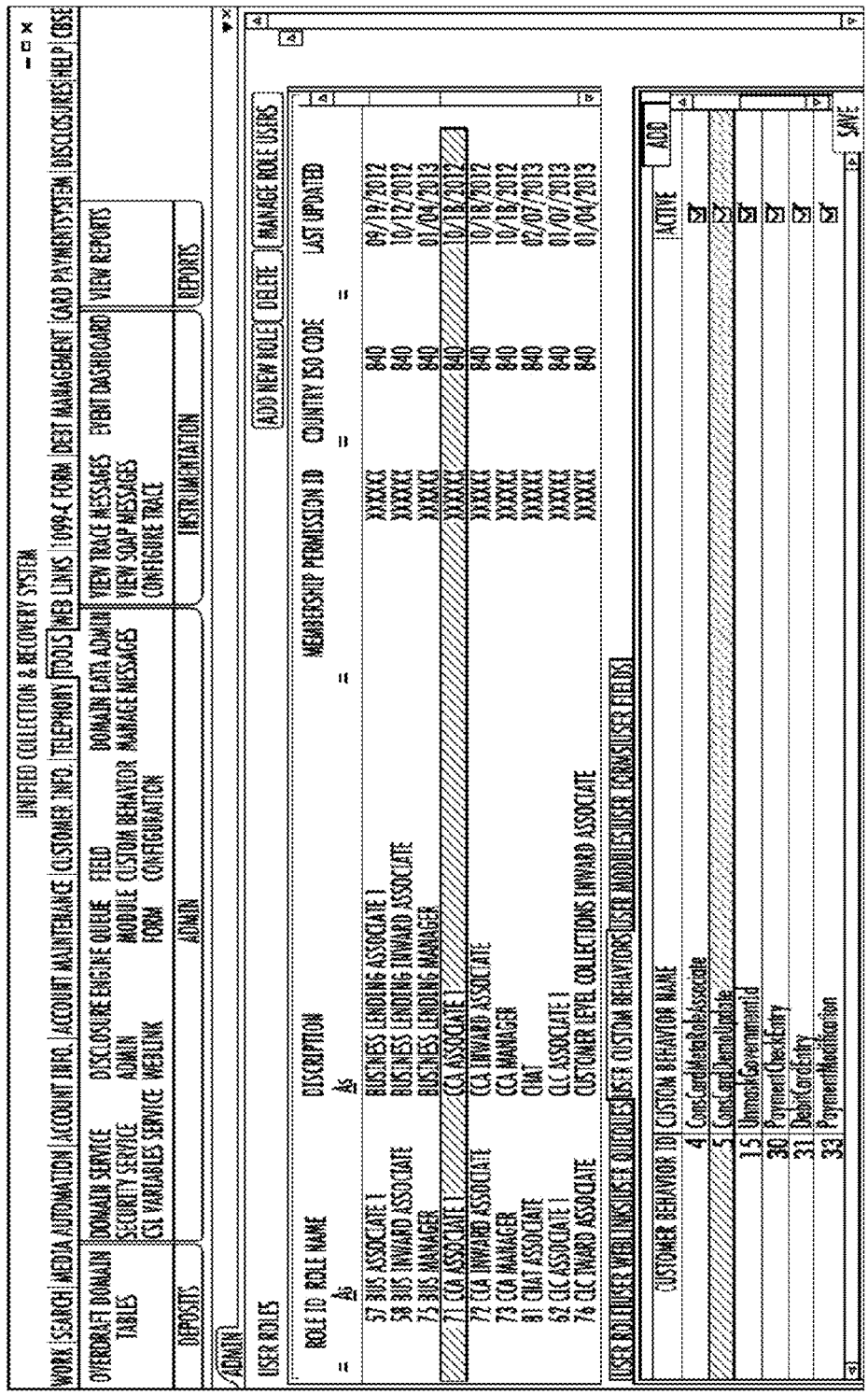
FIG. 11 is an illustration of a graphical user interface for manipulating roles based access for a user in accordance with various embodiments.

As illustrated in FIG. 11, the User Custom Behavior tab includes a list of behaviors that can be included in the role specific client by clicking the active box. The custom behavior dictate how the various modules and forms deployed to the client or other application will behave. For example, a particular role may have a debit card entry behavior or a payment check entry behavior that allows the user associated with the particular role to access certain forms for filling in debit card or check information. A consumer card demo update behavior may be associated with a module that is configured to provide demo updates to the client.

Figure 12:
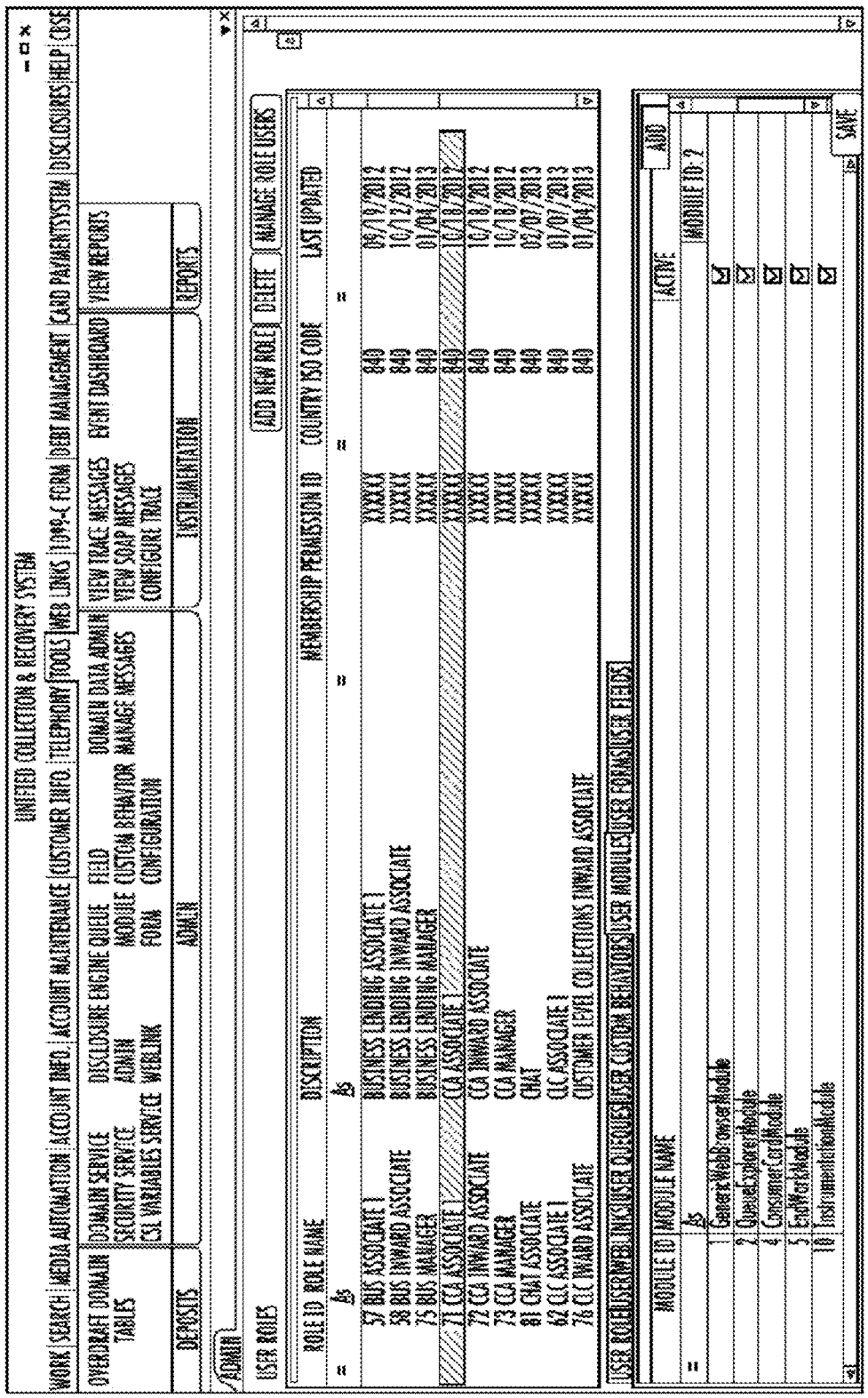
FIG. 12 is an illustration of a graphical user interface for manipulating roles based access for a user in accordance with various embodiments.
Figure 13:
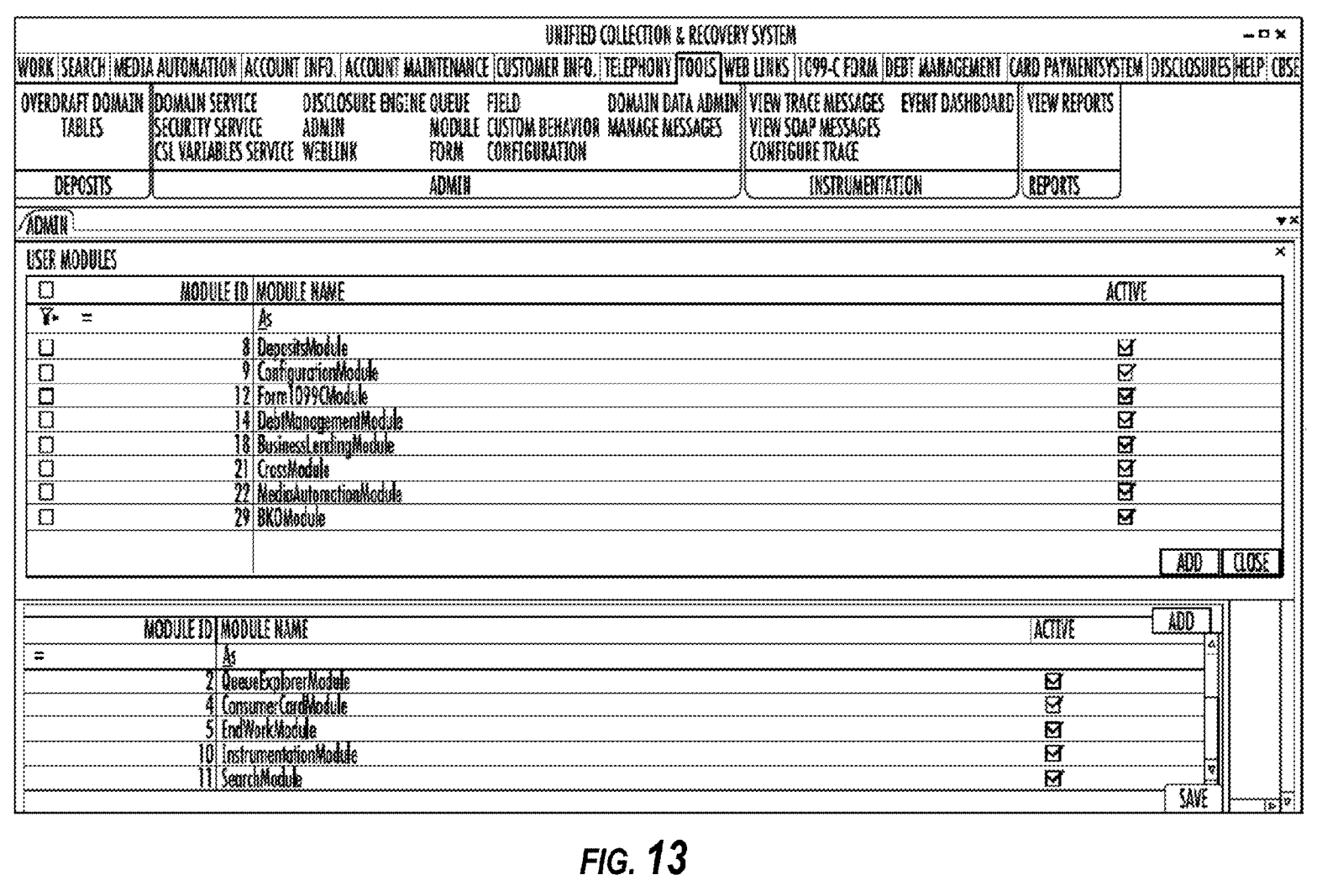

As illustrated in FIG. 12, the User Modules tab provides a list of all modules currently active for the selected user. The modules include, for example, one or more forms, background code, and the like. The administrator may inactivate or add one or more of the modules depending on the changing needs of the system such as increases or decreases in workloads, shift periods, holiday schedules, number of users, time of day, role switches, and so forth. In FIG. 13, the administrator clicks on the "Add" button and selects a module from a list of modules not currently provided to the client associated with the selected role.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for providing roles based access to a user, the system comprising:
    a computer apparatus including a processor and a memory; and
    a deployment software module stored in the memory, comprising executable instructions that when executed by the processor cause the processor to:
        receive metric data of the deployment software module, wherein the metric data comprises information about queues, customer wait time, and expected user input for a plurality of job functions;
        identify an application login event of the user, wherein the application login event is associated with an application configured to be presented to the user for display on a computing device of the user;
        identify a first role associated with the login event, wherein the first role comprises a first job function of the plurality of job functions associated with the user;
        select code associated with the first role;
        insert the code associated with the first role into an application shell to create a modified application shell for the first role, wherein the modified application shell comprises specific modules associated with the first role, the code associated with the first role, and data associated with the first role;
        establish a communication link with the computing device associated with the user, wherein establishing the communication link comprises creating a wireless data channel with the computing device;
        transmit, via the established communication link, the modified application shell to the application stored on the computing device of the user in response to the login event, the modified application shell comprising only first role specific data, wherein data unrelated to the first role is not provided in the application or stored in the computing device;
        generate a first user interface associated with the application to be displayed on the computing device of the user based on at least the code associated with the first role inserted into the application shell, wherein the first user interface is specific to the first role and is generated based on the login event associated with the first role;
        based on the received metric data, calculate at least one of a number of queues, a length of each queue, an average customer wait time, and an amount of required expected user input for a second job function of the plurality of job functions;
        in response to the calculation based on the received metric data, determine that a total number of available users does not provide coverage for a second job function;
        based on the determination that the total number of available users does not provide work coverage for the second job function, identify a second role of the user, wherein the second role comprises the second job function, and wherein the second role is different from the first role;
        remove the code associated with the first role from the modified application shell from the application associated with the computing device of the user;
        select code associated with the second role;
        insert the code associated with the second role into the application shell to create an updated application shell, wherein the updated application shell comprises specific modules associated with the second role, the code associated with the second role, and data associated with the second role;
        transmit, via the established communication link, the updated application shell to the application stored on computing device of the user, the updated application shell comprising only second role specific data, wherein data unrelated to the second role is not provided in the application or stored in the computing device; and
        generate a second user interface associated with the application to be displayed on the computing device of the user based on at least the second code associated with the second role inserted into the updated application shell, wherein the second user interface is specific to the second role.

2. The system of claim 1, wherein the executable instructions further cause the processor to:
    receive login data comprising user credentials or device identifiers;
    match the login data and the first role.

3. The system of claim 1, wherein the executable instructions further cause the processor to:
    calculate a number of times the user has logged into the application and engaged the application with the code associated with the first role during a previous period of time;
    determine an experience level associated with the first role based on the calculated number.

4. The system of claim 1, wherein the executable instructions further cause the processor to:
    receive login data comprising user inputs;
    determine a sequence of user inputs, a number of required user inputs, and types of user inputs;
    determine that the first role is associated with a certain job title or work group based on the user input determination.

5. The system of claim 1, wherein the executable instructions further cause the processor to:
    calculate a role score as a product of a total number of training modules completed by the user multiplied by a predetermined factor; and
    assign the second role based on the calculated role score.

6. The system of claim 5, wherein the executable instructions further cause the processor to:
    switch the second role back to the first role after a predetermined period of time.

7. The system of claim 1, wherein the executable instructions further cause the processor to:
compress the selected code and store the compressed code in a database.

8. The system of claim 1, wherein the content of the modified application shell or the updated application shell is streamed to the computing device of the user and not stored on the computing device of the user.

9. The system of claim 1, wherein the selected code associated with the first role or the second role comprises instruction for modifying account data, calculating interest rates, adjusting account balances, performing searches, creating calling queues for account holders, providing rule specific notifications, or linking to external websites.

10. A computer program product for providing roles based access to a user for a deployment software module, the computer program product comprising:
a non-transitory computer readable storage medium having computer readable program code embodied therewith, the computer readable program code comprising:
computer readable program code configured to receive metric data of the deployment software module, wherein the metric data comprises information about queues, customer wait time, and expected user input for a plurality of job functions;
computer readable program code configured to identify an application login event of the user, wherein the application login event is associated with an application configured to be presented to the user for display on a computing device of the user;
computer readable program code configured to identify a first role associated with the login event, wherein the first role comprises a first job function of the plurality of job functions associated with the user;
computer readable program code configured to select code associated with the first role;
computer readable program code configured to insert the code associated with the first role into an application shell to create a modified application shell for the first role, wherein the modified application shell comprises specific modules associated with the first code, the code associated with the first role, and data associated with the first role;
computer readable program code configured to establish a communication link with the computing device associated with the user, wherein establishing the communication link comprises creating a wireless data channel with the computing device;
computer readable program code configured to transmit, via the established communication link, the modified application shell to the application stored on the computing device of the user in response to the login event, the modified application shell comprising only first role specific data, wherein data unrelated to the first role is not provided in the application or stored in the computing device;
computer readable program code configured to generate a first user interface associated with the application to be displayed on the computing device of the user based on at least the code associated with the first role inserted into the application shell, wherein the first user interface is specific to the first role and is generated based on the login event associated with the first role;
computer readable program code configured to, based on the received metric data, calculate at least one of a number of queues, a length of each queue, an average customer wait time, and an amount of required expected user input for a second job function of the plurality of job functions;
computer readable program code configured to, in response to the calculation based on the received metric data, determine that a total number of available users does not provide coverage for a second job function;
computer readable program code configured to, based on the determination that the total number of available users does not provide work coverage for the second job function, identify a second role of the user, wherein the second role comprises the second job function, and wherein the second role is different from the first role;
computer readable program code configured to remove the code associated with the first role from the modified application shell from the application associated with the computing device of the user;
computer readable program code configured to select code associated with the second role;
computer readable program code configured to insert the code associated with the second role into the application shell to create an updated application shell, wherein the updated application shell comprises specific modules associated with the second role, the code associated with the second role, and data associated with the second role;
computer readable program code configured to transmit, via the established communication link, the updated application shell to the application stored on-computing device of the user, the updated application shell comprising only second role specific data, wherein data unrelated to the second role is not provided in the application or stored in the computing device; and
computer readable program code configured to generate a second user interface associated with the application to be displayed on the computing device of the user based on at least the second code associated with the second role inserted into the updated application shell, wherein the second user interface is specific to the second role.

11. The computer program product of claim 10, further comprising computer readable program code configured to:
receive login data comprising user credentials or device identifiers; and
match the login data and the first role.

12. The computer program product of claim 10, further comprising computer readable program code configured to:
calculate a role score as a product of a total number of training modules completed by the user multiplied by a predetermined factor; and
assign the second role based on the calculated role score.

13. A computer-implemented method providing roles based access to a user for a deployment software module, the method comprising:
receiving, by a processor, metric data of the deployment software module, wherein the metric data comprises information about queues, customer wait time, and expected user input for a plurality of job functions;
identifying, by a processor, an application login event of the user, wherein the application login event is associated with an application configured to be presented to the user for display on a computing device of the user;

identifying, by a processor, a first role associated with the login event, wherein the first role comprises a first job function of the plurality of job functions associated with the user;

selecting code associated with the first role;

inserting, by a processor, the code associated with the first role into an application shell to modify the application shell for the first role, wherein the modified application shell comprises specific modules associated with the first role, the code associated with the first role, and data associated with the first role;

establishing, by a processor, a communication link with the computing device associated with the user, wherein establishing the communication link comprises creating a wireless data channel with the computing device;

transmitting, by a processor, via the established communication link, the modified application shell to the application stored on the computing device of the user in response to the login event, the modified application shell comprising only first role specific data, wherein data unrelated to the first role is not provided in the application or stored in the computing device;

generating, by the processor, a first user interface associated with the application to be displayed on the computing device of the user based on at least the code associated with the first role inserted into the application shell, wherein the first user interface is specific to the first role and is generated based on the login event associated with the first role;

based on receiving the metric data, calculating, by a processor, at least one of a number of queues, a length of each queue, and average customer wait time, and an amount of required expected user input for a second job function;

in response to the calculation based on the received metric data, determining, by a processor, that a total number of available users does not provide work coverage for a second job function;

based on determining that the total number of available users does not provide work coverage for the second job function, identifying, by a processor, a second role of the user, wherein the second role comprises the second job function, and wherein the second role is different from the first role;

removing, by a processor, the code associated with the first role from the modified application shell from the application associated with the computing device of the user;

selecting, by a processor, code associated with the second role;

inserting, by a processor, the code associated with the second role into the application shell to create an updated application shell, wherein the updated application shell comprises specific modules associated with the second role, the code associated with the second role, and data associated with the second role;

transmitting, by a processor, via the established communication link, the updated application shell to the application stored on-computing device of the user, the updated application shell comprising only second role specific data, wherein data unrelated to the second role is not provided in the application or stored in the computing device; and generating, by the processor, a second user interface associated with the application to be displayed on the computing device of the user based on at least the second code associated with the second role inserted into the updated application shell, wherein the second user interface is specific to the second role.

14. The computer-implemented method of claim 13, further comprising:

receiving login data comprising user inputs;

determining, by a processor, a sequence of user inputs, a number of required user inputs, and types of user inputs; and determining, by a processor, that the first role is associated with a certain job title or work group based on the user input determination.

* * * * *